United States Patent
Baehr-Jones et al.

(10) Patent No.: US 8,390,922 B1
(45) Date of Patent: Mar. 5, 2013

(54) PHASE MATCHING FOR DIFFERENCE FREQUENCY GENERATION AND NONLINEAR OPTICAL CONVERSION FOR PLANAR WAVEGUIDES VIA VERTICAL COUPLING

(75) Inventors: Tom Baehr-Jones, Seattle, WA (US); Michael J. Hochberg, Seattle, WA (US)

(73) Assignee: University of Washington, Seattle, WA (US)

( * ) Notice: Subject to any disclaimer, the term of this patent is extended or adjusted under 35 U.S.C. 154(b) by 443 days.

(21) Appl. No.: 12/630,833

(22) Filed: Dec. 3, 2009

Related U.S. Application Data

(63) Continuation of application No. 12/511,116, filed on Jul. 29, 2009, now abandoned.

(60) Provisional application No. 61/084,481, filed on Jul. 29, 2008.

(51) Int. Cl.
*G02F 2/02* (2006.01)
*G02F 1/35* (2006.01)

(52) U.S. Cl. .......... 359/332; 359/328; 385/122; 372/22; 250/504 R

(58) Field of Classification Search .......... 359/326–332; 385/122; 372/21–22; 250/504 R
See application file for complete search history.

(56) References Cited

U.S. PATENT DOCUMENTS

| | | | | | |
|---|---|---|---|---|---|
| 5,061,048 | A | * | 10/1991 | Hayden et al. | 359/315 |
| 5,333,000 | A | * | 7/1994 | Hietala et al. | 342/368 |
| 5,543,805 | A | * | 8/1996 | Thaniyavarn | 342/368 |
| 5,694,134 | A | * | 12/1997 | Barnes | 343/700 MS |
| 6,128,421 | A | * | 10/2000 | Roberts | 385/3 |
| 2009/0148095 | A1 | * | 6/2009 | Pesetski et al. | 385/3 |

* cited by examiner

*Primary Examiner* — Daniel Petkovsek
(74) *Attorney, Agent, or Firm* — Milstein Zhang & Wu LLC; Joseph B. Milstein

(57) ABSTRACT

A high index contrast waveguide based source for radiation. In some embodiments, the radiation is in the 0.5-14 Terahertz regime. Waveguides are provided that permit the generation of radiation at the sum and/or difference frequency of two input beams. In order to control the power level within the waveguide, embodiments in which pluralities of similar or identical waveguide are provided, and the input radiation is divided among the plurality of waveguides. The output radiation can be steered by applying phased array methods and principles.

23 Claims, 21 Drawing Sheets

PHASE MATCHING FOR DIFFERENCE FREQUENCY GENERATION AND NONLINEAR OPTICAL CONVERSION FOR PLANAR WAVEGUIDES VIA VERTICAL COUPLING

CROSS-REFERENCE TO RELATED APPLICATIONS

This application is a continuation of co-pending U.S. utility patent application Ser. No. 12/511,116, filed on Jul. 29, 2009, and this application claims priority to and the benefit of the earliest effective filing date of that co-pending application, which co-pending U.S. utility patent application Ser. No. 12/511,116 in turn claims priority to and the benefit of U.S. provisional patent application Ser. No. 61/084,481, filed Jul. 29, 2008, each of which applications is incorporated herein by reference in its entirety.

FIELD OF THE INVENTION

The invention relates to optical sources and detectors in general and particularly to optical and terahertz sources and detectors that use light to modulate light and that employ materials, such as polymers, having large nonlinear optical characteristics.

BACKGROUND OF THE INVENTION

The structure of telecommunications systems today is fundamentally different from that of transistor-based electronics. Broadly speaking, computation is not done today commercially in the optical domain; computation and logic is done with transistor-based logic. Fiber optics are often used for transmitting high speed data streams over longer distances, while slower and shorter-distance communications continues to be dominated by electronic signaling which is often done with copper wires or with short range wireless communication systems, such as WiFi. This is partially a result of the high cost of optical devices, and partially a result of the complexity and cost of the electronics required for high-bit-rate applications.

The very fastest commercially available optical detectors and modulators available today are limited by free-carrier diffusion speeds and by the speed of the supporting electronics to the Gigahertz frequency range. The speeds of such devices have been relatively static for several years, and cannot be expected to increase dramatically in the near future. The electronics to generate high-rate bit streams and the amplifier electronics required in order to recover high speed signals from high-speed detectors are both quite complex and expensive at speeds exceeding approximately 10 Gb/s.

The field of nonlinear optics is extremely rich in results, and has been around for many years. Basically the premise of nearly all measurements in the field is that one introduces a sufficiently high power flux (or "fluence," a term of art) in an optical material, it is often possible to excite nonlinear behavior, meaning that the properties of the material change with the input optical power. This kind of effect is very often described through the use of, for instance. Chi² ($\chi^2$) and Chi³ ($\chi^3$) which are material dependent constants that describe the strength of two of the relevant nonlinear optical activities of a material. Some nonlinearities, which are material dependent, will work at the full optical frequency, while others are slower. Recently, engineered organic materials have begun to be used for nonlinear optics, because they can be designed to have extremely large $\chi^2$ and $\chi^3$ moments.

It would be desirable to be able to perform computations or analog signal processing purely in the optical domain, without the data stream having to be converted into an electrical signal by a detector. There is a need for systems and methods that can fully exploit the optical properties of materials that exhibit large $\chi^2$ and $\chi^3$ moments without having to provide excessive amounts of optical power to do so.

SUMMARY OF THE INVENTION

In one aspect, the invention features an apparatus for generating and steering electromagnetic radiation. The apparatus comprises a substrate having a surface; and a waveguide adjacent the surface of the substrate, the waveguide having at least one input port for receiving a first input light beam having a first frequency and a second input light beam having a second frequency different from the first frequency, and configured to have a plurality of adjacent waveguide segments, the plurality of adjacent waveguide segments of the waveguide configured as a phased array; the waveguide is configured so that, in response to a first input light beam provided as a first laser beam having a first frequency, and a second input light beam provided as a second laser beam having a second frequency, an output electromagnetic radiation beam is generated that includes a signal at a frequency corresponding to a difference between the first frequency of the first input light beam and the second frequency of the second input light beam, the output electromagnetic radiation beam configured to be steered by the phased array.

In one embodiment, the substrate comprises silicon. In one embodiment, the electromagnetic radiation is terahertz electromagnetic radiation. In one embodiment, the waveguide has a width dimension in the range of 0.4 µm to 0.6 µm. In one embodiment, the waveguide is a high index contrast waveguide. In one embodiment, the apparatus for generating and steering electromagnetic radiation further comprises a cladding adjacent the waveguide, the cladding comprising a material that exhibits a nonlinear optical coefficient. In one embodiment, the cladding comprising a material that exhibits a nonlinear optical coefficient is a material exhibiting a $\chi^2$ coefficient. In one embodiment, the apparatus for generating and steering electromagnetic radiation further comprises electrodes for poling the material exhibiting a $\chi^2$ coefficient. In one embodiment, the cladding comprising a material that exhibits a nonlinear optical coefficient is a material exhibiting a $\chi^3$ coefficient. In one embodiment, the waveguide has a thickness dimension of approximately 0.1 µm. In one embodiment, the cladding adjacent the waveguide is an optical polymer. In one embodiment, the cladding comprising a material that exhibits an enhanced nonlinear optical coefficient is an electro-optic polymer material. In one embodiment, the plurality of adjacent waveguide segments of the waveguide configured as a phased array are configured in a serpentine configuration. In one embodiment, the plurality of adjacent waveguide segments of the waveguide configured as a phased array are configured as segments that branch from a common input. In one embodiment, the plurality of adjacent waveguide segments of the waveguide configured as a phased array are configured to control a relative phase of illumination passing through different ones of the plurality of adjacent waveguides. In one embodiment, the plurality of adjacent waveguide segments of the waveguide configured as a phased array are configured to apply a phase shift to one or more beams of generated illumination in different ones of the plurality of adjacent waveguides. In one embodiment, the plurality of adjacent waveguide segments of the waveguide configured as a phased array are configured to control which of different ones of the plurality of parallel waveguides carry generated beams at any particular time. In one embodiment, at least one of the first input light beam and the second input light beam is a continuous-wave laser beam.

In another aspect, the invention features a method of generating and steering electromagnetic radiation. The method requires provision of a structure comprising a substrate having a surface; and a waveguide adjacent the surface of the substrate, the waveguide having at least one input port for receiving a first input light beam having a first frequency and a second input light beam having a second frequency different from the first frequency, and configured to have a plurality of adjacent waveguide segments, the plurality of adjacent waveguide segments of the waveguide configured as a phased array; the waveguide is configured so that, in response to a first input light beam provided as a first laser beam having a first frequency, and a second input light beam provided as a second laser beam having a second frequency, an output electromagnetic radiation beam is generated that includes a signal at a frequency corresponding to a difference between the first frequency of the first input light beam and the second frequency of the second input light beam, the output electromagnetic radiation beam configured to be steered by the phased array. The method comprises the steps of providing a first continuous-wave laser beam having a first frequency as input at the at least one input port; providing a second continuous-wave laser beam having a second frequency different from the first frequency as input at the at least one input port, and observing electromagnetic radiation at a difference frequency between the first frequency of the first input laser beam and the second frequency of the second input laser beam.

In one embodiment, the method of generating and steering electromagnetic radiation further comprises the step of controlling a relative phase of illumination passing through different ones of the plurality of adjacent waveguides. In one embodiment, the method of generating and steering electromagnetic radiation further comprises the step of applying a phase shift to one or more beams of generated illumination in different ones of the plurality of adjacent waveguides. In one embodiment, the method of generating and steering electromagnetic radiation further comprises the step of controlling which of different ones of the plurality of parallel waveguides carry generated beams at any particular time. In one embodiment, the method of generating and steering electromagnetic radiation further comprises the step of controlling an intensity of the generated electromagnetic radiation.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 10C is a diagram that shows a plot of modal patterns over four periods of a segmented waveguide on a horizontal plane that intersects the silicon layer halfway through.

DETAILED DESCRIPTION OF THE INVENTION

High Index Contrast Waveguides

Figure 1:
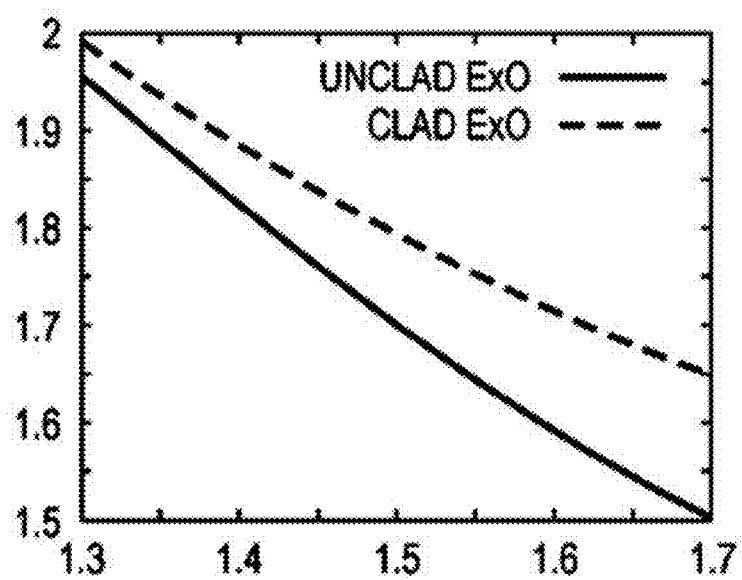
FIG. 1 is a diagram showing dispersion plots for the fundamental mode (Ex polarized) of exemplary clad and unclad waveguides, shown as effective index vs. wavelength in μm.

We now describe high index contrast waveguides that are useful to concentrate light in order to enhance nonlinear optical effects in various materials so that such effects can be employed to manipulate light (or more generally electromagnetic radiation) at low power levels, as compared to conventional systems and methods that employ nonlinear optical materials. The manipulation of electromagnetic radiation or light can be useful to provide a variety of components that perform operations on light such as rectification, modulation, filtering, and logic operations in a manner analogous to the same operations which are provided using electronic devices operating on electrical signals. For example, an input light wave to be processed is impressed onto the component. The light wave has at least one parameter characterizing the light wave, such as one of an intensity, a polarization, a frequency, a wavelength, and a duration (e.g., a pulse length, or in the case of continuous wave light, an effectively infinite duration). After the input light wave is processed (or interacts with the waveguide and the clad nonlinear optical material adjacent to the waveguide when present), an output signal is observed. In a circumstance where the input signal has been processed, the output signal has at least one parameter that is different from at least one parameter characterizing the input light wave, including possibly an electrical output signal when the input light wave had no electrical signal component (e.g., optical rectification).

We have developed a set of tools for concentrating light to a high degree by using silicon or other high index contrast waveguides, and we have fabricated devices that demonstrate some of the many applications that can be contemplated when such nonlinear materials are exploited. In particular, by utilizing split waveguides, we are able to greatly enhance the optical fields in the cladding of a tightly confined waveguide, without greatly enhancing the optical losses of the same waveguide. Combining the high field concentrations available from the split waveguides with the high nonlinear activity of nonlinear optical polymers permits the development of nonlinear optical devices operating at much lower optical input power levels than are possible with conventional free space or chip based systems. We have demonstrated four-wave mixing (which is based upon $\chi^3$), as well as optical rectification (based on $\chi^2$), in such waveguides. Using these waveguides it is possible to decrease the power levels needed to observe significant nonlinearities to the point where, by contrast with conventional nonlinear optics, it can be done with non-pulsed, continuous wave lasers.

Chi2 ($\chi^2$) and Chi3 ($\chi^3$) based optical effects can be used in particular to build on-chip optical parametric oscillator ("OPO") systems, where two input wavelengths can be mixed together to produce sum and difference frequencies. These frequencies can be either higher or lower than the input frequencies, and can be made tunable. These effects work for frequencies from the ultraviolet and X-ray regime all the way out into the far infrared and microwave, and in fact can work down to DC in some cases, particularly with optical rectification.

The material of which the high index waveguide is made can be any material having a high index that is reasonably transparent at the wavelengths of interest. This can include but is not limited to silicon, gallium nitride, indium phosphide, indium gallium nitride, gallium phosphide, diamond, sapphire, or the various quaternary III/V and II/VI materials such as aluminum gallium arsenide phosphide. III/V denotes materials having at least one element from column III of the periodic table of elements (or an element that is stable as a positive trivalent ion) and at least one element from column V (or an element that is stable as a negative trivalent ion). Examples of III/V compounds include BN, AlP, GaAs and InP. II/VI denotes materials having at least one element from column II of the periodic table of elements (or an element that is stable as a positive divalent ion) and at least one element from column VI (or an element that is stable as a negative divalent ion). Examples of II/VI compounds include MgO, CdS, ZnSe and HgTe.

We present successively the mechanical structure of exemplary embodiments of high index waveguides, exemplary embodiments of cladding materials having large nonlinear constants $\chi^2$ and $\chi^3$ and their incorporation into devices having high index waveguides, and some exemplary results observed on some of the fabricated devices that are described.

Exemplary High Index Waveguide Structures

High-Q Ring Resonators in Thin Silicon-On-Insulator

Resonators comprising high-Q microrings were fabricated from thin silicon-on-insulator (SOI) layers. Measured Q values of 45,000 were observed in these rings, which were then improved to 57,000 by adding a PMMA cladding. Various waveguide designs were calculated, and the waveguide losses were analyzed.

Microring resonator structures as laser sources and as optical filter elements for dense wavelength division multiplexing systems have been studied in the past. The silicon-on-insulator (SOI) structure described here is particularly advantageous. It has low waveguide loss. One can extrapolate an uncoupled Q value of 94,000 and a waveguide loss of 7.1 dB/cm in the unclad case, and −6.6 dB/cm in the PMMA clad case, from the respective measured Q values of 45,000 and 57,000. Although higher Q values have been obtained for optical microcavities, we believe that our geometry has the highest Q for a resonator based on a single mode silicon waveguide. It is also noteworthy that a large amount of power appears outside the core silicon waveguide, which may be important in some applications. The modes that are described herein have approximately 57% of the power outside the waveguide, as compared to 20% for a single-mode 200-nm-thick silicon waveguide, and 10% for a single-mode 300-nm-thick silicon waveguide.

In one embodiment, wafer geometries were selected that minimize the thickness of the SOI waveguiding layer as well as the buried oxide, but still yield low loss waveguides and bends. A number of different waveguide widths were compared by finite difference based mode solving. The geometry used in the exemplary embodiment comprises a 500-nm-wide waveguide formed in a 120-nm-thick silicon layer, atop a 1.4 μm oxide layer, which rests on a silicon handle, such as a silicon wafer as a substrate. Such a configuration supports only a single well-contained optical mode for near infrared wavelengths. The dispersion characteristics are shown in FIG. 1 for both unclad and PMMA-clad waveguides. Our interest in unclad structures stems from the ease of fabrication, as detailed in the following, as well as the flexibility an open air waveguide may provide for certain applications.

These modes were determined by using a finite difference based Hermitian eigensolver. It is possible to calculate the loss directly from the mode pattern with an analytic method valid in the low-loss limit. The waveguide loss at 1.55 μm calculated in such a fashion is approximately −4.5 dB. This loss figure was in agreement with the extrapolated results of FDTD simulation.

Because a loss of −4 dB/cm is attributed to substrate leakage, the waveguide loss can be improved by the addition of a cladding, which tends to pull the mode upwards. This notion is supported by the measured decrease in waveguide loss upon the addition of a PMMA cladding. It can be shown that the substrate leakage loss attenuation coefficient is nearly proportional to $$e^{-2\sqrt{n_{\it eff}^2 - n_o^2}\, k_0 A}$$

if $k_0$ is the free space wave number, $n_{\it eff}$ is the effective index of the mode, $n_0$ is the effective index of the oxide layer, and A is the thickness of the oxide. In the present case, the e-folding depth of the above-mentioned function turns out to be 180 nm, which explains why the substrate leakage is so high.

SOI material with a top silicon layer of approximately 120 nm and 1.4 μm bottom oxide was obtained in the form of 200 mm wafers, which were manually cleaved, and dehydrated for 5 min at 180° C. The wafers were then cleaned with a spin/rinse process in acetone and isopropanol, and air dried. HSQ electron beam resist from Dow Corning Corporation was spin coated at 1000 rpm and baked for 4 min at 180° C. The coated samples were exposed with a Leica EBPG-5000+ electron beam writer at 100 kV. The devices were exposed at a dose of 4000 μc/cm², and the samples were developed in MIF-300 TMAH developer and rinsed with water and isopropanol. The patterned SOI devices were subsequently etched by using an Oxford Plasmalab 100 ICP-RIE within 12 mTorr of chlorine, with 800 W of ICP power and 50 W of forward power applied for 33 s. Microfabricated devices such as the one shown in FIG. 2 were tested by mounting the dies onto an optical stage system with a single-mode optical fiber array. A tunable laser was used first to align each device, and then swept in order to determine the frequency domain behavior of each of the devices. Light was coupled into the waveguides from a fiber mode by the use of grating couplers. Subsequently the devices were spin-coated with 11% 950K PMMA in Anisole, at 2000 rpm, baked for 20 min at 180° C., and retested.

The theoretical development of the expected behavior of a ring resonator system has been described in the technical literature. In the present case the dispersion of the waveguide compels the addition of a dispersive term to the peak width. We take $\lambda_0$ to be the free space wavelength of a resonance frequency of the system, $n_0$ to be the index of refraction at this wavelength, $(\delta n/\delta\lambda)_0$, the derivative of n with respect to $\lambda$ taken at $\lambda_0$, L to be the optical path length around the ring, α to be the optical amplitude attenuation factor due to loss in a single trip around the ring, and finally t to be the optical amplitude attenuation factor due to traveling past the coupling region. In the limit of a high Q, and thus $$(1-\alpha) \ll 1 \text{ and } (1-t) \ll 1,$$

we have $$Q = (\pi L/\lambda_0)[n_0 - \lambda_0 (\delta n/\delta\lambda)_0]/(1 - \alpha t) \tag{1}$$

Figure 2:
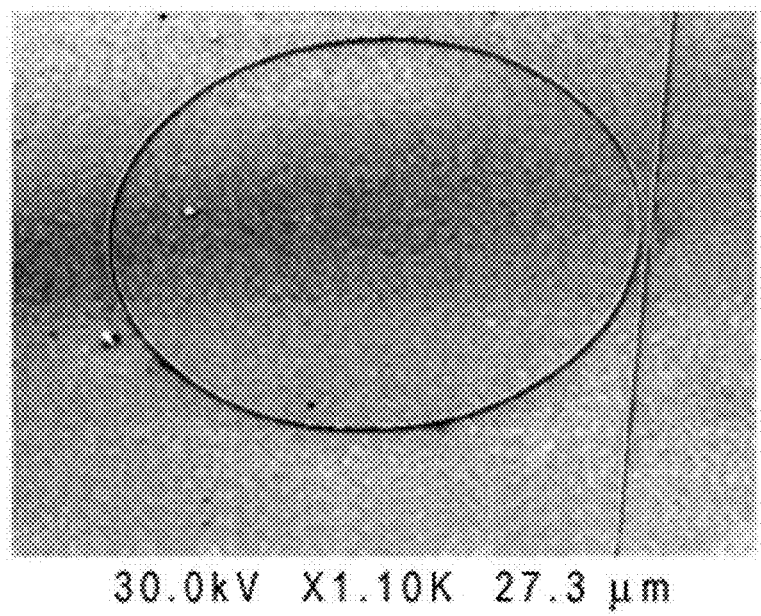
FIG. 2 is a diagram showing an SEM image of an exemplary ring resonator.
Figure 3:
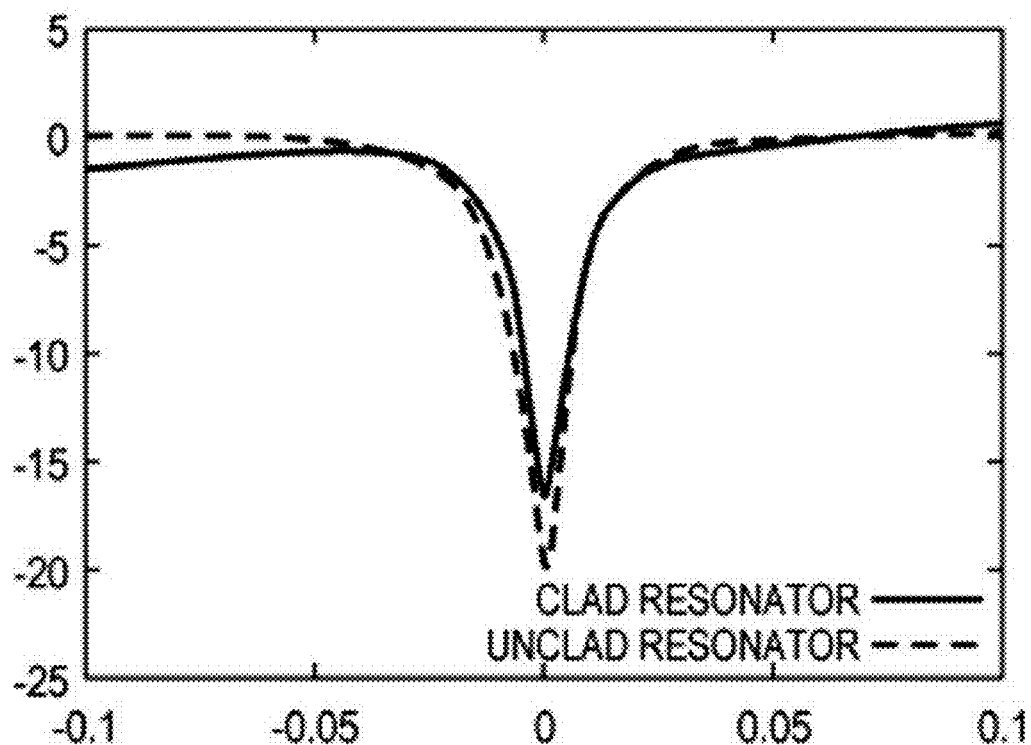
FIG. 3 is a diagram showing the normalized transmission of light through the system (and past the ring) in dB, as a function of wavelength detuning in nm for both clad and unclad waveguides, shifted to overlay resonance peaks.

The waveguide mode was coupled into a ring resonator from an adjacent waveguide. As shown in FIG. 2, the adjacent waveguide can in some embodiments be a linear waveguide. The strength of coupling can then be lithographically controlled by adjusting the distance between the waveguide and the ring. This ring was fabricated with a radius of 30 μm, a waveguide width of 500 nm, and a separation between ring and waveguide of 330 nm. For the clad ring presented, the measured Q is 45,000, and the extinction ratio is −22 dB, for the resonance peak at 1512.56 nm. The PMMA clad ring had a similar geometry, and achieved a Q of 57,000, but with an extinction ratio of −15.5 dB. Typical observed transmission spectra are shown in FIG. 3. The typical amount of optical power in the waveguide directly coupling into the resonator was about 0.03 mW. A dependence of the spectrum on this power was not observed, to within an order of magnitude.

From the mode-solving results for the unclad waveguides, we have $(\delta n/\delta\lambda)(1.512) = -1.182 \text{ μm}^{-1}$, and $n(\lambda=1.512) = 1.688$. Using this result and the earlier relations, the waveguide loss can be calculated from the measured Q value. Specifically, an extinction that is at least −22 dB indicates that a critically coupled Q in this geometry is greater than 38,500, which then implies a waveguide loss of less than −7.1 dB/cm. In similar fashion, the PMMA clad waveguide resonator with a Q of 57,000 but only −15.5 dB of extinction allows a worst case waveguide loss of −6.6 dB/cm. This also implies an intrinsic Q of 77,000 for the unclad resonator, and an intrinsic Q of 94,000 for the PMMA clad resonator.

These devices have a slight temperature dependence. Specifically, the resonance peak shifts correspondingly with the change in the refractive index of silicon with temperature, moving over 2 nm as temperature shifts from 18 to 65° C. The Q rises with higher temperatures slightly, from 33 k at 18° C.

to 37 k on one device studied. This shift can probably be explained entirely by the dependence of Q on the effective index.

High-Q Optical Resonators in Silicon-On-Insulator Based Slot Waveguides

We now describe the design, fabrication and characterization of high Q oval resonators based on slot waveguide geometries in thin silicon on insulator material. Optical quality factors of up to 27,000 were measured in such filters, and we estimate losses of −10 dB/cm in the slotted waveguides on the basis of our resonator measurements. Such waveguides enable the concentration of light to very high optical fields within nano-scale dimensions, and show promise for the confinement of light in low-index material with potential applications for optical modulation, nonlinear optics and optical sensing. As will be appreciated, the precise geometry of a resonator (or other kinds of devices) is frequently a matter of design, and the geometry can be varied based on such considerations as length of waveguide, area of a chip, and required interaction (or required non-interaction), such as coupling (or avoiding coupling) with other waveguide structures that are present in a device or on a chip. In some embodiments, the waveguide can be a closed loop, such as at least one ring or at least one oval shaped endless stripe. As has been explained, optical energy can be provided to such a closed loop, for example with an input waveguide.

One can form high quality factor ring or oval resonators in SOI. In these SOI waveguides, vertical confinement of light is obtained from the index contrast between the silicon core and the low index cladding (or air) and the buried silicon dioxide layer, whereas lateral confinement can be obtained by lithographically patterning the silicon. The majority of the light tends to be guided within the silicon core in such waveguide. Although the high refractive index contrast between silicon and its oxide provide excellent optical confinement, guiding within the silicon core can be problematic for some applications. In particular, at very high optical intensities, two-photon absorption in the silicon may lead to high optical losses. Moreover, it is often desirable to maximize the field intensity overlap between the optical waveguide mode and a lower index cladding material when that cladding is optically active and provides electro-optic modulation or chemical sensing.

One solution to these problems involves using a slot waveguide geometry. In a slot waveguide, two silicon stripes are formed by etching an SOI slab, and are separated by a small distance. In one embodiment, the separation is approximately 60 nm. The optical mode in such a structure tends to propagate mainly within the center of the waveguide. In the case of primarily horizontal polarization, the discontinuity condition at the cladding-silicon interface leads to a large concentration of the optical field in the slot or trench between the two stripes. One can predict that the electric field intensity would be approximately $10^8 \sqrt{P}$ V/m where P is the input power in watts. One design uses a 120 nm silicon on insulator layer and 300 nm wide silicon strips on top of a 1.4 μm thick buried oxide layer, which is in turn deposited on a silicon substrate. Various widths for the central slot were fabricated to provide test devices with 50, 60 and 70 nm gaps. Slots larger than 70 nm have also been fabricated and were shown to work well.

In the 1.4-1.6 μm wavelength regime, the waveguide geometry is single mode, and a well-contained optical mode is supported between the two silicon waveguide slabs. There is some loss that such an optical mode will experience even in the absence of any scattering loss or material absorption due to leakage of light into the silicon substrate. The substrate loss can be estimated semi-analytically via perturbation theory, and ranges from approximately −0.15 dB/cm at 1.49 μm to about −0.6 dB/cm at 1.55 μm for the SOI wafer geometry of the present embodiment.

Figure 4:
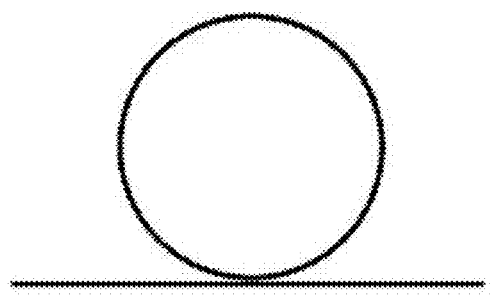
FIG. 4 is a diagram showing the device layout of an exemplary slot waveguide.

Oval resonators were fabricated by patterning the slot waveguides into an oval shape. An oval resonator geometry was selected in preference to the more conventional circular shape to enable a longer coupling distance between the oval and the external coupling waveguide or input waveguide. See FIG. 4. Slots were introduced into both the oval and external coupling waveguides.

Predicting coupling strength and waveguide losses for such devices is not easy. Many different coupling lengths and ring to input waveguide separations were fabricated and tested. It is well known that the most distinct resonance behavior would be observed for critically coupled resonators, in which the coupling strength roughly matches the round trip loss in the ring.

An analytic expression for the quality factor of a ring resonator was presented in equation (1) hereinabove. Also, the free spectral range can be calculated via:

$$\Delta\lambda = (\lambda_0/L)/[1/L + n_0/\lambda_0 - (\delta n/\delta\lambda)_0] \quad (2)$$

Here, L is the round trip length in the ring, and $n_0$ and $\lambda_0$ are the index of refraction, and the wavelength at resonance, respectively. The derivative of the effective index with respect to the wavelength at the resonance peak is given by $(\delta n/\delta\lambda)_0$, and it can be shown that this term is roughly equal to −0.6 $\mu m^{-1}$ from the 1.4-1.6 μm spectral range for the slot waveguides studied here.

Figure 5:
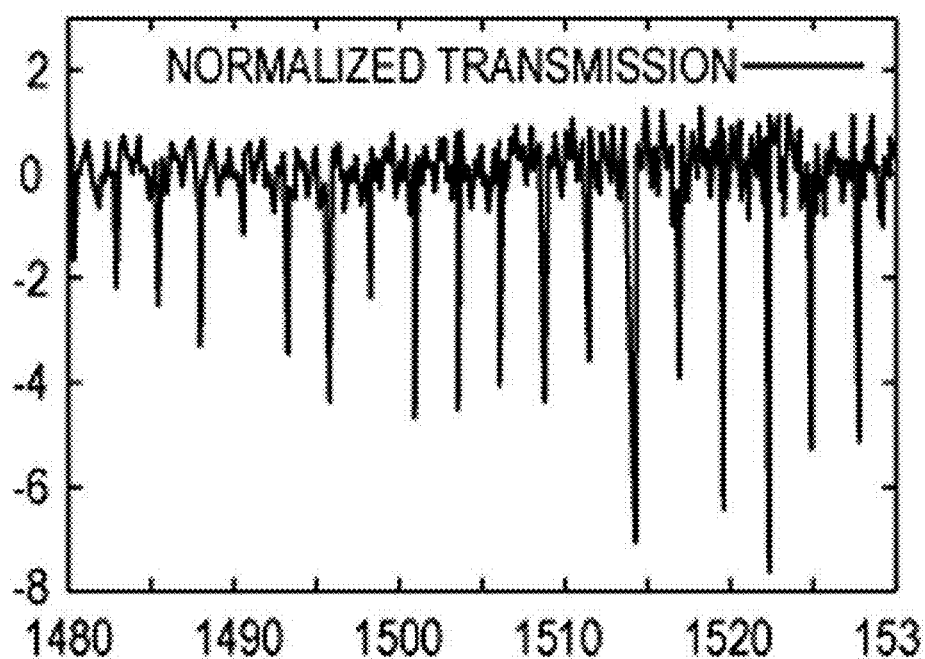
FIG. 5 is a diagram showing the measured transmission spectrum in dB vs. laser wavelength in nm past a high quality factor slot ring resonator.
Figure 6:
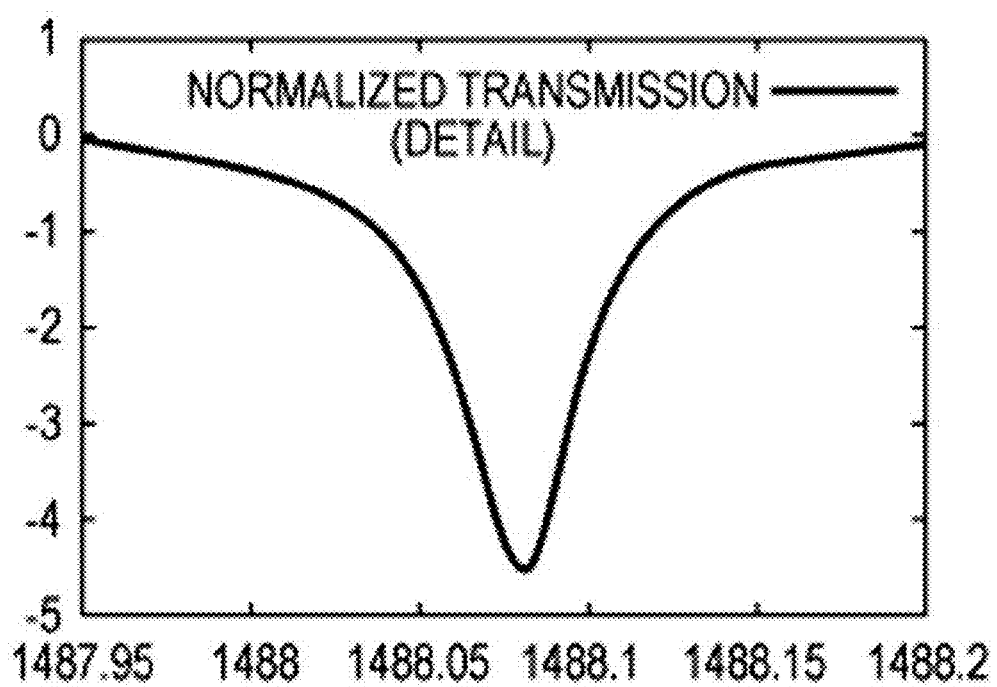
FIG. 6 is a diagram showing the detail of the peak of the transmission spectrum near 1488 nm.

We have observed a quality factor of 27,000 in a device fabricated with a slot size of 70 nm, a ring to input waveguide edge to edge separation of 650 nm, and a coupling distance of 1.6 μm. The radius of the circular part of the slotted oval was 50 μm. This resonance was observed near 1488 nm, and the resonance peak had an extinction ratio of 4.5 dB. FIG. 5 shows the measured transmission spectrum past the ring, normalized for the input coupler baseline efficiency of our test system. FIG. 6 shows the details of one peak in the vicinity of 1488 nm. Because the extinction ratio at the resonance peak was not very large in this case, it was not possible to accurately determine waveguide losses from this device. By measuring many devices with different geometries, we obtained data on resonators with higher extinction ratios that approached critical coupling. One such device was a 50 μm radius slotted ring resonator with a 60 nm waveguide gap, a ring to input waveguide spacing of 550 nm and coupling length of 1.6 μm. In this device, a Q of 23,400 was observed near 1523 nm, with an on-resonance extinction of 14.7 dB.

Since this resonance is nearly critically coupled, the waveguide loss can be estimated using equation (1) as −10 dB/cm. We can also use equation (2) to further validate our theoretical picture of the ring resonator. The observed free spectral range of this resonator was 2.74 nm, while equation (2) predicts 2.9 nm. This discrepancy is most likely due to small differences in the fabricated dimensions as compared to those for which the numerical solutions were obtained.

To further validate the waveguide loss result, several waveguide loss calibration loops were fabricated with varying lengths of the slot waveguide, ranging from 200 to 8200 um in length. A total of five center slot waveguide devices were studied for each of the 50, 60 and 70 nm slot widths. Linear regression analysis on the peak transmission of each series yielded waveguide loss figures of 11.6±3.5 dB/cm for the 50 nm center waveguide, 7.7±2.3 dB/cm for the 60 nm center waveguide, and 8.1±1.1 dB/cm for the 70 nm center waveguide. These figures are in agreement with the loss estimated from the oval resonator. Since the theoretical loss due to substrate leakage is much lower than this, it is clear that a great deal of loss is due to surface roughness and possibly material absorption. It is believed that engineering improvements will decrease this loss further. For sensing and modulation applications as well as use in nonlinear optics, the high optical field concentration that can be supported in the cladding material of the slotted waveguide geometry should be very advantageous when compared to more conventional waveguides.

Figure 7:
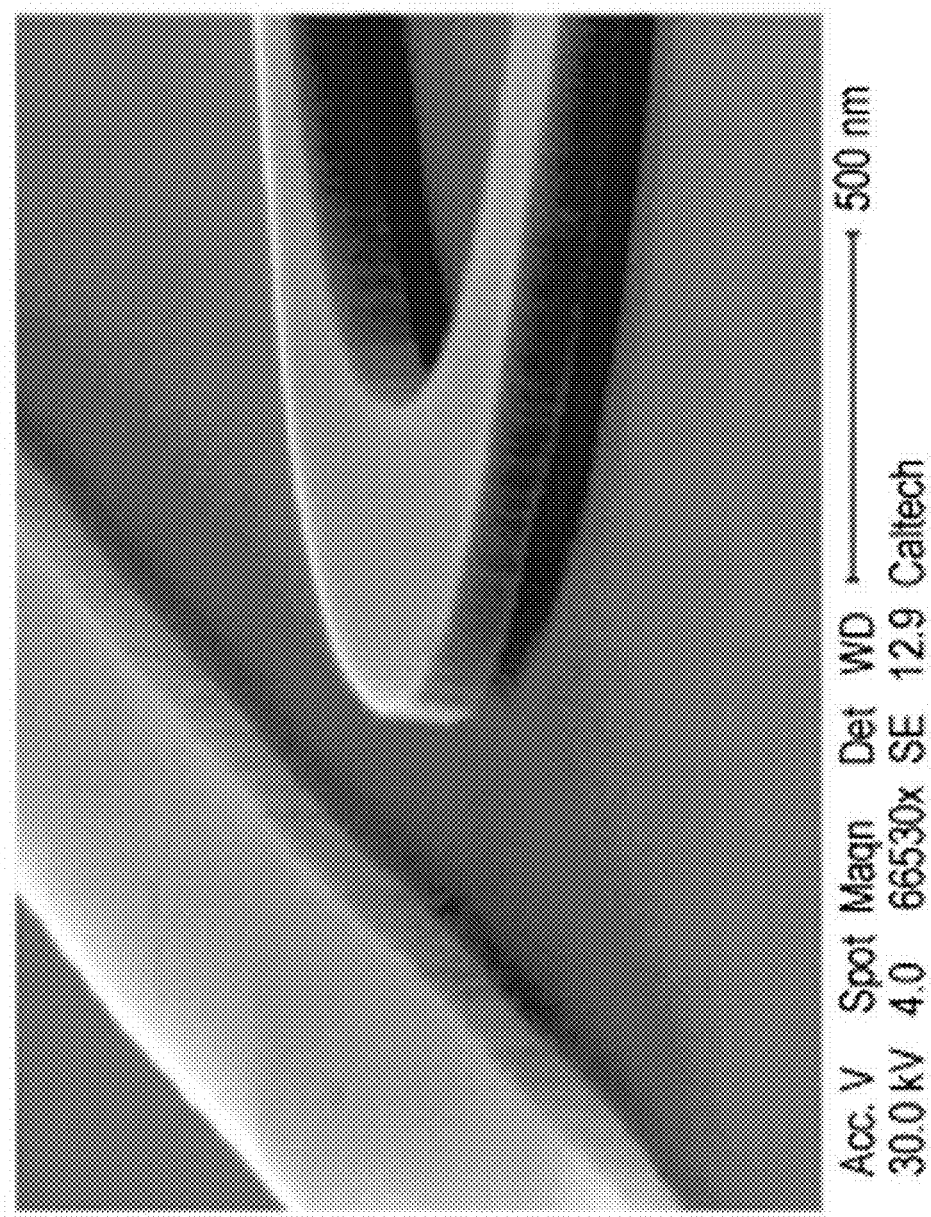
FIG. 7 is a diagram showing a shallow angle SEM view of a typical silicon-on-insulator ring resonator and waveguide having a sidewall roughness on the order of 10 nm.
Figure 8:
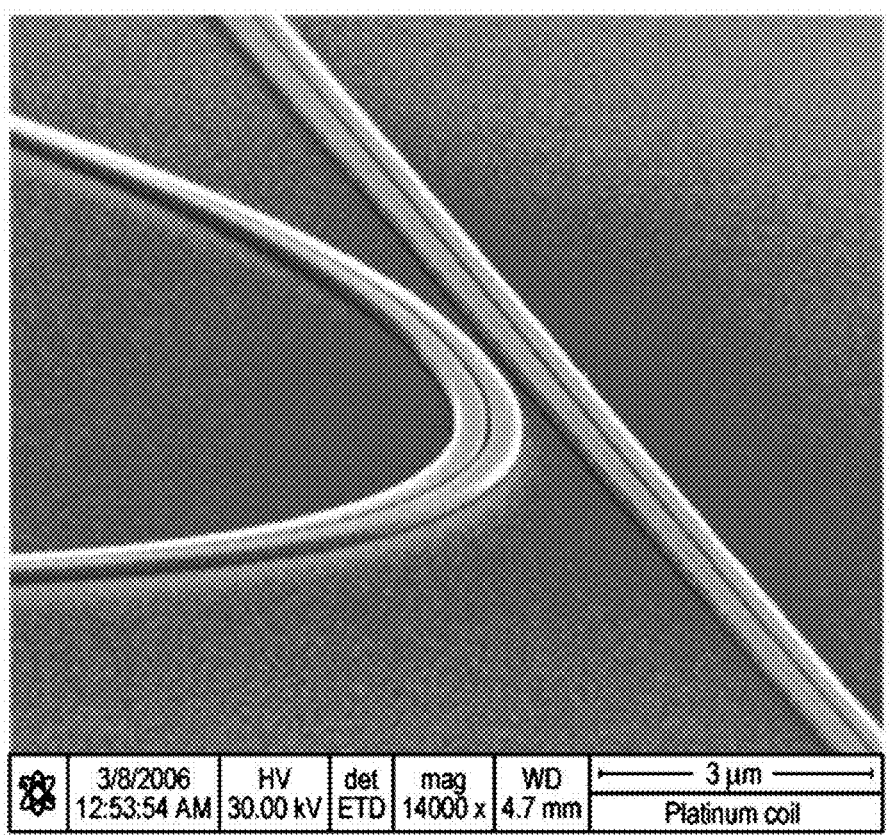
FIG. 8 is a diagram of a slot ring resonator directional coupler region, and the associated input waveguide.

FIG. 7 is a diagram showing a shallow angle SEM view of a silicon-on-insulator ring resonator and waveguide having a sidewall roughness on the order of 10 nm. In the exemplary waveguide shown in FIG. 7, the silicon-insulator bond has been decorated with a brief buffered oxide etch. FIG. 8 is a diagram of a slot ring resonator directional coupler region, and the associated input waveguide.

Figure 9:
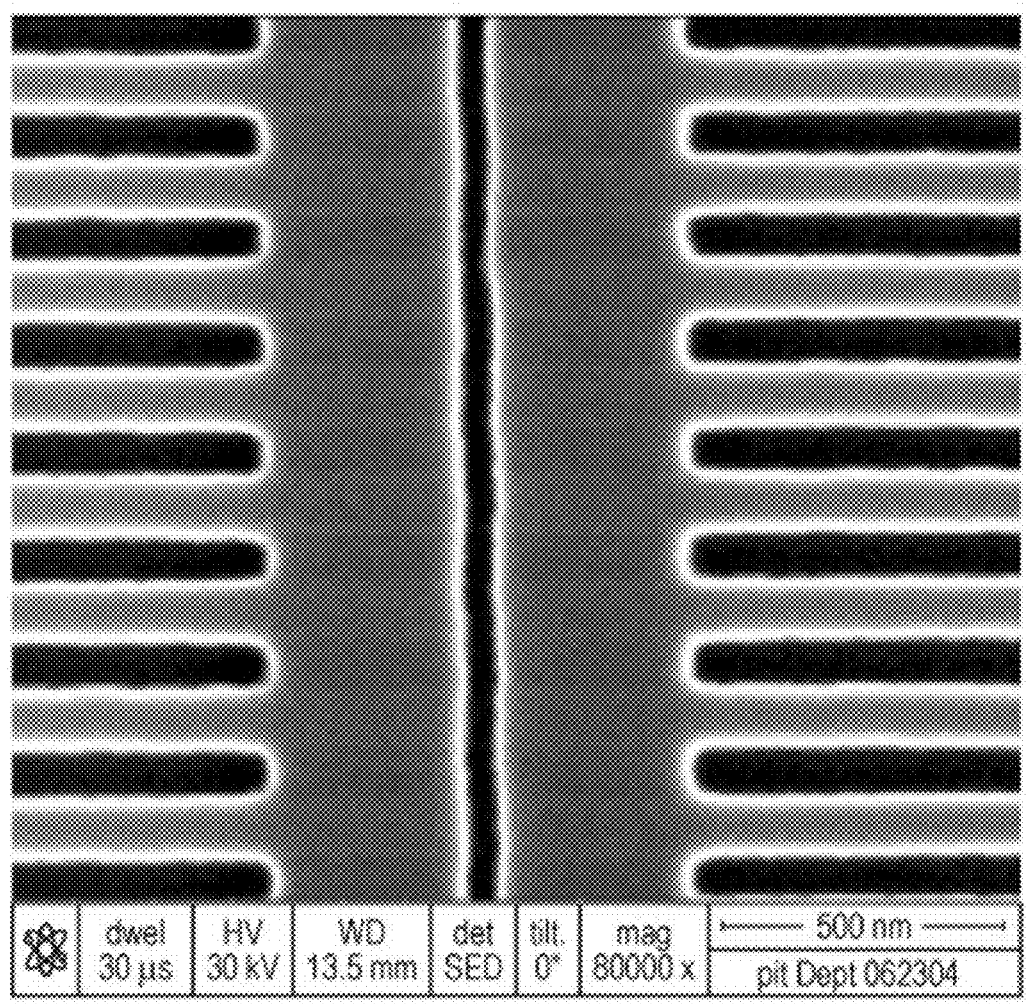
FIG. 9 is a diagram showing an exemplary high-index segmented waveguide structures, which in the embodiment shown comprises a central waveguide portion with fingers or ridges sticking out to the sides.

Other variations on the geometry of waveguides are possible. FIG. 9 is a diagram showing an exemplary high-index segmented waveguide structures, which in the embodiment shown comprises a central waveguide portion with fingers or ridges sticking out to the sides. With the light localized in the center in a Bloch mode, electrical contact can be established using the fingers or ridges that stick off the sides of the waveguide. This structure provides a way to form both electrical contacts to waveguides and structures that would provide electrical isolation with low optical loss. Through an iterative process involving a combination of optical design using a Hermetian Bloch mode eigensolver and fabrication of actual structures, it was found that (non-slotted) segmented waveguide structures could be constructed in 120 nm thick SOI. Waveguide losses as small as −16 dB per centimeter were observed, and insertion losses as small as −0.16 dB were shown from standard silicon waveguides.

Figure 10A:
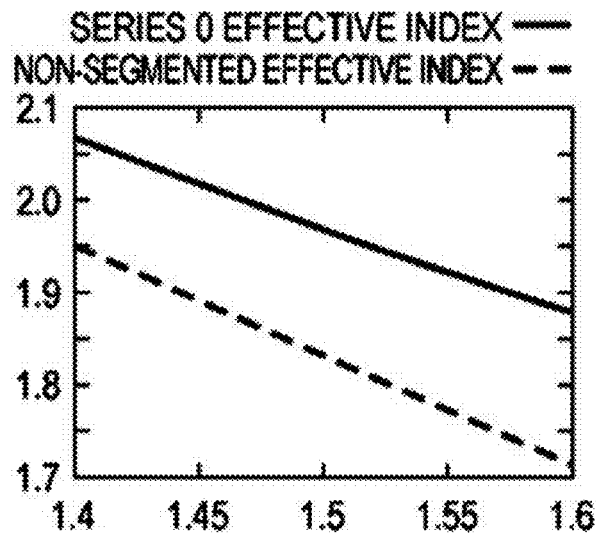
FIG. 10A is a diagram that shows a dispersion diagram of both a segmented waveguide and the normal, unsegmented waveguide, taken on a plane parallel to the substrate that on a z plane intersects the middle of a segment.
Figure 10B:
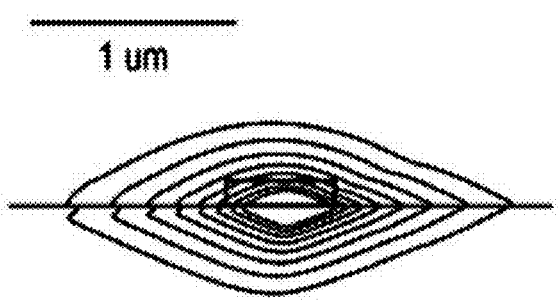
FIG. 10B is a diagram that shows modal patterns of the Bloch mode, with contours of |E| plotted, starting at 10% of the max value and with contour increments of 10%.
Figure 10C:
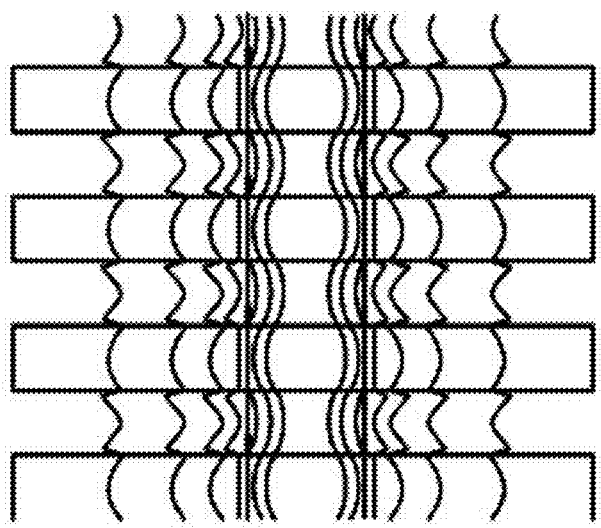

The segmented waveguide structure can also be modeled as regards its expected properties, which can then be compared to actual results. FIG. 10A is a diagram that shows a dispersion diagram of both a segmented waveguide and the normal, unsegmented waveguide, taken on a plane parallel to the substrate that on a z plane that intersects the middle of a segment. FIG. 10B is a diagram that shows modal patterns of the Bloch mode, with contours of |E| plotted, starting at 10% of the max value and with contour increments of 10%. FIG. 10C is a diagram that shows a plot of modal patterns over four periods of a segmented waveguide on a horizontal plane that intersects the silicon layer halfway through.

Figure 11:
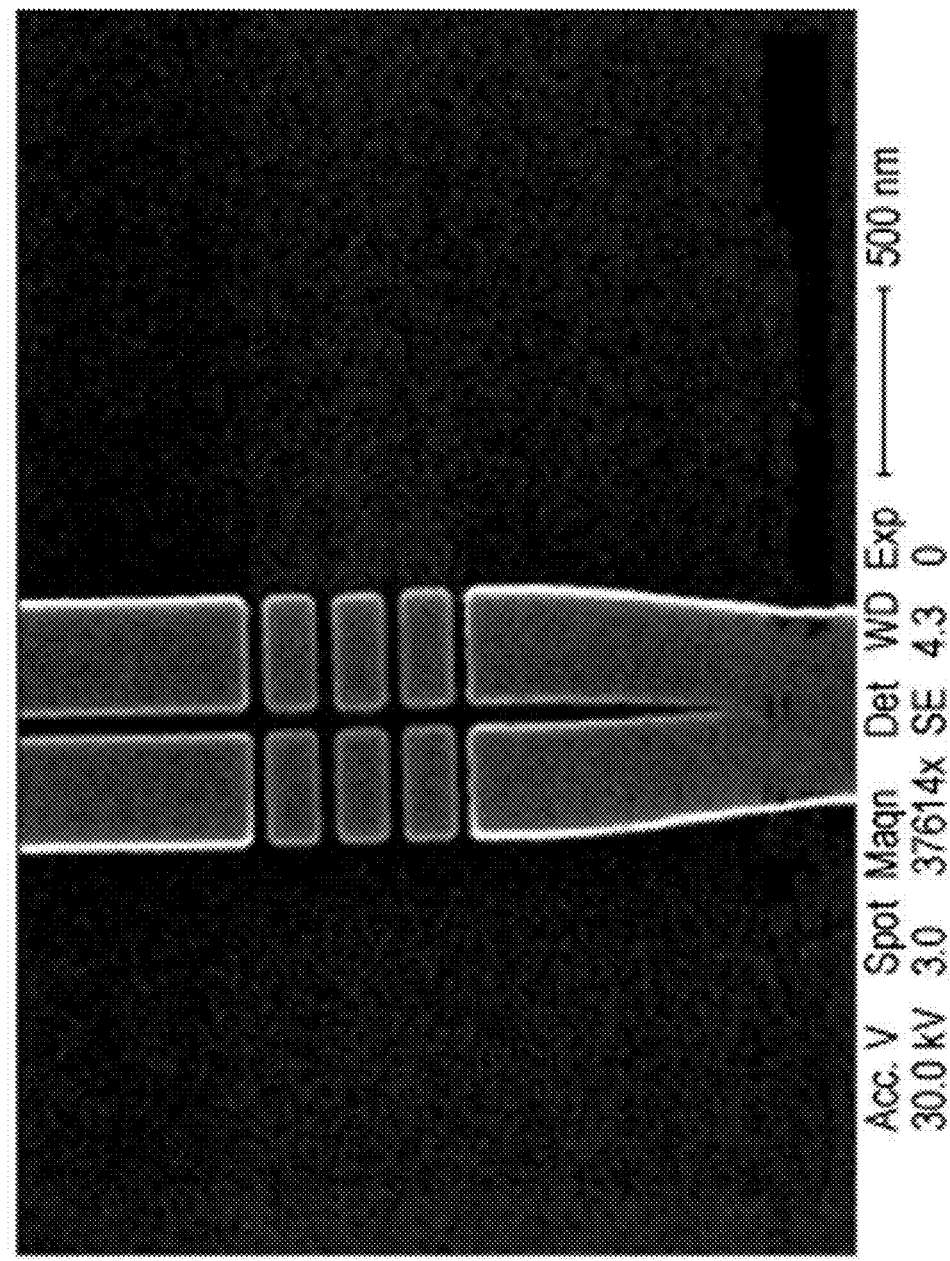
FIG. 11 is a diagram that shows an exemplary electrical isolator that was constructed and tested, and which provided both a transition from a standard to a slotted waveguide and electrical isolation between the two sides of the slot waveguide.

By utilizing the same type of design methodology as was used for the segmented waveguides, one is able to able to construct structures that provide electrical isolation without substantial optical loss. FIG. 11 is a diagram that shows an exemplary electrical isolator that was constructed and tested, and which provided both a transition from a standard to a slotted waveguide and electrical isolation between the two sides of the slot waveguide. Such structures were shown to have losses on the order of 0.5 dB.

Optical Modulation and Detection in Slotted Silicon Waveguides

In this example, we describe a system and process that provide low power optical detection and modulation in a slotted waveguide geometry filled with nonlinear electro-optic polymers and present examples that demonstrate such methods. The nanoscale confinement of the optical mode, combined with its close proximity to electrical contacts, enables the direct conversion of optical energy to electrical energy, without external bias, via optical rectification, and also enhances electro-optic modulation. We demonstrate this process for power levels in the sub-milliwatt regime, as compared to the kilowatt regime in which optical nonlinear effects are typically observed at short length scales. The results presented show that a new class of detectors based on nonlinear optics can be fabricated and operated.

Waveguide-based integrated optics in silicon provide systems and methods for concentrating and guiding light at the nanoscale. The high index contrast between silicon and common cladding materials enables extremely compact waveguides with very high mode field concentrations, and allows the use of established CMOS fabrication techniques to define photonic integrated circuits. By using slotted waveguides, it is possible to further concentrate a large fraction of the guided mode into a gap within the center of a silicon waveguide. This geometry greatly magnifies the electric field associated with the optical mode, resulting in electric fields of at least (or in excess of) $10^6$ V/m for continuous-wave, sub-milliwatt optical signals. Moreover, since the slotted geometry comprises two silicon strips which can be electrically isolated, a convenient mechanism for electro-optic interaction is provided. Such waveguides can be fabricated with low loss. We have previously described systems that provide losses below −10 dB/cm.

In the present example, we exploit both the high intensity of the optical field and the close proximity of the electrodes for several purposes. First, we demonstrate detection of optical signals via direct conversion to electrical energy by means of nonlinear optical rectification. An exemplary device comprises a ring resonator with an electro-optic polymer based $\chi^2$ material deposited as a cladding. Inside the slot, the high optical field intensity creates a standing DC field, which creates a virtual voltage source between the two silicon electrodes, resulting in a measurable current flow, in the absence of any external electrical bias. Though optical rectification has been observed in electro-optic polymers, typically instantaneous optical powers on the order of 1 kW are needed for observable conversion efficiencies, often achieved with pulsed lasers. The exemplary embodiment provides measurable conversion with less than 1 mW of non-pulsed input, obtained from a standard, low power tunable laser operating near 1500 nm.

In one embodiment, systems and methods of the invention provide standard Pockels' effect based modulation, which is similarly enhanced by means of the very small scale of our device. The close proximity of the electrodes, and ready overlap with the optical mode, causes an external voltage to produce a far larger effective electric modulation field, and therefore refractive index shift, than would be obtained through conventional waveguide designs. In one embodiment, the modulation and refractive index shift is provided by tuning the resonance frequencies of a slot waveguide ring resonator.

Device Fabrication

Waveguide Fabrication

The devices described in this example were fabricated in electronic grade silicon-on-insulator (SOI) with a top layer thickness of 110 nm and an oxide thickness of 1.3 microns. The silicon layer is subsequently doped to approximately $10^{19}$ Phosphorous atoms/cm$^3$, yielding resistivities after dopant activation of about 0.025 ohm-cm. Electro-optic ("EO") polymers were then spin-deposited onto the waveguide structures and subsequently poled by using a high field applied across the slot in the waveguide.

Lithography was performed using a Leica EBPG 5000+ electron beam system at 100 kv. Prior to lithography, the samples were manually cleaved, cleaned in acetone and isopropanol, baked for 20 minutes at 180 C, coated with 2 percent HSQ resist from Dow Corning Corporation, spun for two minutes at 1000 rpm, and baked for an additional 20 minutes. The samples were exposed at 5 nm step size, at 3500

μC/cm². The samples were developed in AZ 300 TMAH developer for 3 minutes, and etched on an Oxford Instruments PLC Plasmalab 100 with chlorine at 80 sccm, forward power at 50 W, ICP power at 800 W, 12 mTorr pressure, and 33 seconds of etch time. The samples were then implanted with phosphorous at normal incidence, 30 keV energy, and 1×10¹⁴ ions/cm² density. The sample was annealed under a vacuum at 950 C in a Jipilec Jetstar rapid thermal annealer. The samples were dipped in buffered hydrofluoric acid in order to remove the remnants of electron beam resist from the surface.

After initial optical testing, the samples were coated with YLD 124 electro-optic polymer, and in one case with dendrimer-based electro-optic material. The samples were stored under a vacuum at all times when they were not being tested, in order to reduce the chances of any degradation.

Measurement Results

Optical Rectification Based Detection

Figure 12:
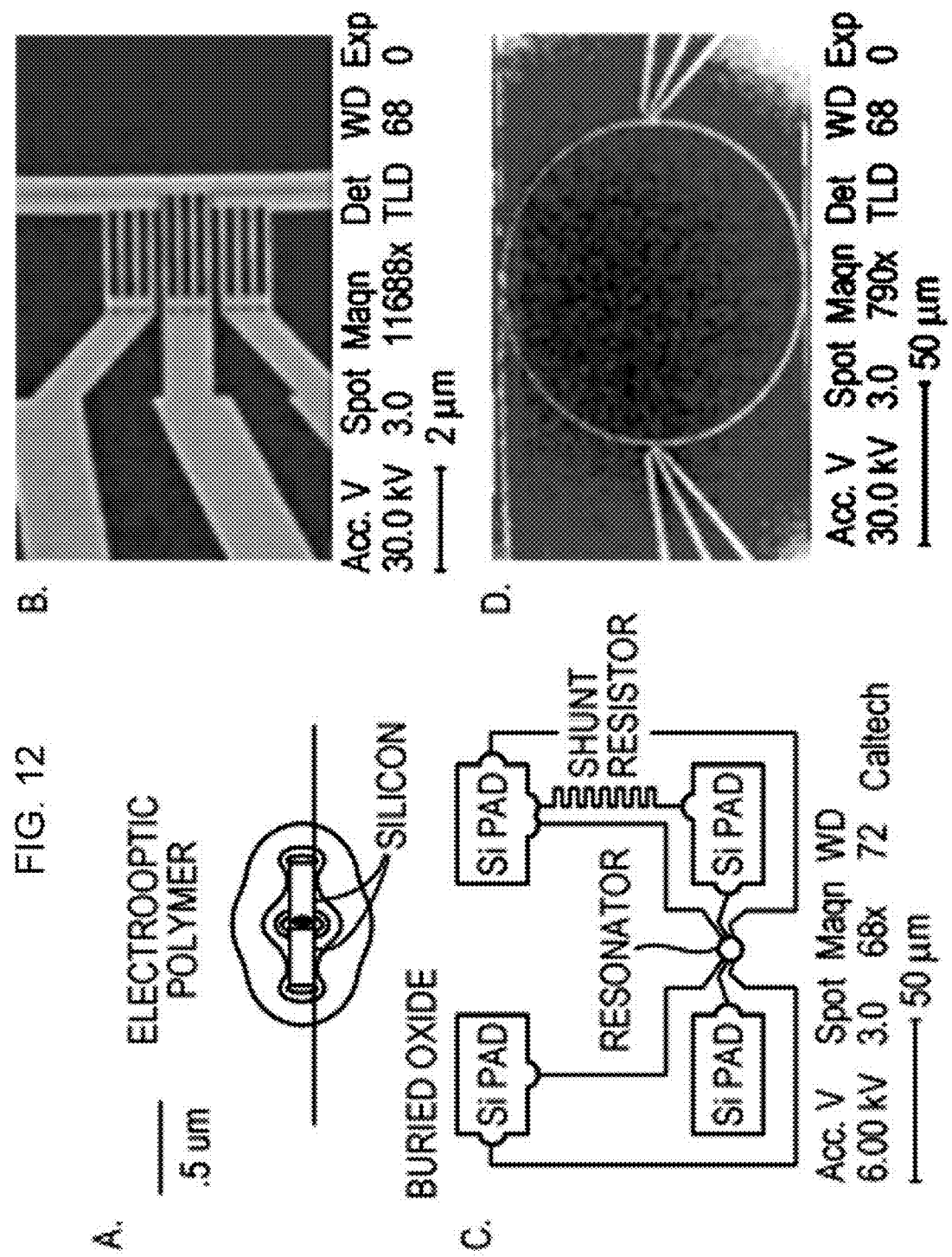
FIG. 12 is a four panel diagram that shows details of one embodiment of an optical modulator device, including the geometry of the photodetectors and filters, and including a cross section of the slotted waveguide.

FIG. 12 is a four panel diagram that shows details of one embodiment of an optical modulator device, including the geometry of the photodetectors and filters, and including a cross section of the slotted waveguide. Panel A of FIG. 12 shows a cross section of the device geometry with optical mode superimposed on a waveguide. In FIG. 12A, the optical mode was solved using a finite-difference based Hermetian Eigensolver, such as that described by A. Taflove, *Computational Electrodynamics*, (Artech House, Boston. Mass., 1995), and has an effective index of approximately 1.85 at 1500 nm. Most of the electric field is parallel to the plane of the chip, and it is possible to contact both sides of the slot in a slotted ring resonator, as shown in FIG. 12B, which shows a SEM image of the resonator electrical contacts. Electrically isolated contacts between the silicon rails defining the slotted waveguide introduce only about 0.1 dB of optical loss. FIG. 12C shows the logical layout of device, superimposed on a SEM image of a device. FIG. 12C details the layout of a complete slotted ring resonator, with two contact pads connected to the outer half of the ring, and two pads electrically connected to the inner half of the ring. A shunt resistor provides a means of confirming electrical contact, and typical pad-to-pad and pad-to-ring resistances range from 1 MΩ to 5 MΩ. FIG. 12D displays a typical electrically contacted slotted ring as presently described. FIG. 12D is an image of the ring and the electrical contact structures.

Measurements were performed with single-mode polarization maintaining input and output fibers, grating coupled to slotted waveguides with an insertion loss of approximately 8 dB. Optical signal was provided from an Agilent 81680A tunable laser and in some cases an erbium doped fiber amplifier ("EDFA") from Keopsys Corporation. A continuous optical signal inserted into a poled polymer ring results in a measurable current established between the two pads, which are electrically connected through a pico-Ammeter. In the most sensitive device, a DC current of ~1.3 nA was observed, indicating an electrical output power of ~10⁻⁹ of the optical input power (5×10⁻¹² W of output for approximately 0.5 mW coupled into the chip). Control devices, in which PMMA or un-poled EO material was substituted, show no photocurrent.

The fact that there is no external bias (or indeed any energy source) other than the optical signal applied to the system of this embodiment demonstrates conclusively that power is being converted from the optical signal. To establish that the conversion mechanism is actually optical rectification, we performed a number of additional measurements. A steady bias was applied to the chip for several minutes, as shown in Table 1A. A substantial change in the photoresponse of the device was observed. This change depends on the polarity of the bias voltage, consistent with the expected influence of repoling of the device in-place at room temperature. Specifically, if the external bias was applied opposing the original poling direction, conversion efficiency generally decreased, while an external bias in the direction of the original poling field increased conversion efficiency.

TABLE 1

Polling Results

Part A:

| Action | New Steady State Current (6 dBm input) |
|---|---|
| Initial State | −5.7 pA |
| +10 V for 2 minutes | 0 pA |
| −10 V for 2 minutes | −7.1 pA |
| +10 V for 2 minutes | −4.4 pA |
| +10 V for 4 minutes | −6.1 pA |
| −10 V for 4 minutes | −4.5 pA |
| −10 V for 2 minutes | −14.8 pA |

Part B:

| Device | Action | Current Polarity of Optical Rectification |
|---|---|---|
| 1 | Positive Poling | Positive |
| 1 | Thermal Cycling to poling temperature with no voltage | Rapid fluctuation, did not settle |
| 1 | Negative Poling | Negative |
| 2 | Negative Poling | Negative |
| 2 | Thermal Cycling to Poling temperature with no voltage | None observable |
| 2 | Positive Poling | Negative |
| 3 | Negative Poling | Negative |
| 4 | Positive Poling | Positive |
| 5 | Negative Poling | Negative |

To further understand the photo-conversion mechanism, 5 EO detection devices were poled with both positive and negative polarities, thus reversing the direction of the relative $\chi^2$ tensors. For these materials, the direction of $\chi^2$ is known to align with the polling E field direction, and we have verified this through Pockels' effect measurements. In all but one case, we observe that the polarity of the generated potential is the same as that used in poling, and the +V terminal during poling acts as the −V terminal in spontaneous current generation, as shown in Table 1B. Furthermore, the polarity of the current is consistent with a virtual voltage source induced through optical rectification. It was observed that these devices decay significantly over the course of testing, and that in one case the polarity of the output current was even observed to spontaneously switch after extensive testing. However, the initial behavior of the devices after polling seems largely correlated to the $\chi^2$ direction.

Part A of Table 1 shows the dependence of the steady state observed current after room temperature biasing with various voltage polarities for one device. The device was originally polled with a ~12 V bias, though at 110 C. With one exception, applying a voltage in the direction of the original polling voltage enhances current conversion efficiencies, while applying a voltage against the direction of the polling voltage reduces the current conversion efficiencies. It should be noted that the power coupled on-chip in these measurements was less than 1 mW due to coupler loss.

Part B of Table 1 shows the behavior of several different devices immediately after thermal polling or cycling without voltage. Measurements were taken sequentially from top to bottom for a given device. The only anomaly is the third measurement on device 2; this was after significant testing, and the current observed was substantially less than was observed in previous tests on the same device. We suspect that the polymer was degraded by repeated testing in this case.

Analysis of Data for Optical Rectification

To derive the magnitude of the expected photocurrent, we assume that the $\chi^2$ magnitude relating to the Pockets' effect is similar to that for optical rectification. A measurement of $\chi^2$ can then be obtained from the direct observation of the electro-optic coefficient by the standard measurements described earlier. The typical measured tuning value of 2 GHz/V yields approximately 50 pm/V.

In the best case, devices with 6 dBm of input power returned approximately 1.4 nA of current. With Qs ranging from 3 k to 5 k, and assuming approximately 7 dB of insertion loss in the input grating coupler on one of our chips, in the best case as much as 0 dBm might be circulating in a resonator on resonance. This implies a peak electric field due to the optical signal of approximately $3.1 \times 10^6$ V/m. The induced static nonlinear polarization field is then nearly 1000 V/m, which amounts to a voltage drop of $14 \times 10^{-5}$ V across a 140 nm gap. If this voltage is assumed to be perfectly maintained, and the load resistance is assumed to be 5 M$\Omega$, then 28 pA would be generated, about a factor of 100 less than is observed in the largest measurement made, but within a factor of 20 of the typical measurement of 352 pA for 6 dBm of input. Significantly, because the generated current is quadratic in E, it is clear that the current will be linearly proportional to the input intensity. This is in accordance with our observations. The best results for optical rectification were obtained with YLD 124/APC polymer, whereas our best Pockels' Effect results were obtained with the dendrimer materials.

Significantly, the sign of the output current matches that which would be predicted by nonlinear optical rectification, as discussed above. Specifically, since positive current emanates from the positive terminal, the rectified E field has a sign reversed from the $\chi^2$ and the polling E field. It is well established that the $\chi^2$ direction tends to align with the direction of the polling E field. Because of this, the rectified field acting as a voltage source will produce an effective positive terminal at the terminal that had the positive polling voltage.

We do not yet fully understand the current generation mechanism. In particular, it is not clear what provides the mechanism for charge transport across the gap. The APC material in which the nonlinear polymer is hosted is insulating, and though it does exhibit the photoconductivity effect due to visible light, it is unclear whether it can for near-infrared radiation. Photoconductivity due to second harmonic generation may play a role in this effect. It is certainly the case, however, that current flows through this gap; that is the only region in the entire system where an electromotive force exists. Also, photoconductivity alone is not adequate to explain the reversal of the current coming from the detector devices when the poling direction is reversed, nor the conversion of the optical input into directed current in general. The only mechanism to our knowledge that adequately explains this data is optical rectification.

If we assume that it will be possible to achieve a 10-fold improvement in the Q's of the resonators, while still getting more than 10 dB of extinction, then the intensity circulating in such a ring would be about 13 dB up from the intensity of the input wave. By comparison, with a Q of about 1000 and high extinction, the peak circulating intensity is about the same as the intensity in the input waveguide. Therefore, it is reasonable to expect that it will be possible to get at least 10 dB of improvement in the circulating intensity, and thus in the conversion efficiency, by fabricating higher Q rings.

By combining the nano-scale slotted waveguide geometry with electro-optical polymers having high nonlinear constants, we have obtained massive enhancement of the optical field. That has in turn enabled us to exploit nonlinear optical processes that are typically only available in the kW regime in the sub-mW regime. This difference is so considerable that we believe it represents a change in kind for the function of nonlinear optical devices. In addition, it is believed that this hybrid material system provides systems and methods for creating compact devices that exploit other nonlinear phenomena on-chip.

Optical rectification based detectors can have many advantages over currently available technology. In particular, such detectors are expected to function at a higher intrinsic rate than the typical photodiode in use, as the optical rectification process occurs at the optical frequency itself, on the order of 100 THz in WDM systems. The absence of an external bias, and the generation of a voltage rather than a change in current flow, both provide certain advantages in electronic operation. We also believe that a device based on nonlinear optical rectification will not suffer from the limitation of a dark current. This in turn can provide WDM systems that will function with lower optical power, providing numerous benefits. Similarly, our demonstration of enhanced modulation using these waveguide geometries provides useful components for future communications systems.

We believe that there will be advantageous economic aspects of such devices in various embodiments. Because our devices can be fabricated in planar electronics grade silicon-on-insulator, using processes compatible with advanced CMOS processing, it is expected that devices embodying these principles will be less expensive to fabricate.

Optical Modulators

Optical modulators are a fundamental component of optical data transmission systems. They are used to convert electrical voltage into amplitude modulation of an optical carrier frequency, and they can serve as the gateway from the electrical to the optical domain. High-bandwidth optical signals can be transmitted through optical fibers with low loss and low latency. All practical high-speed modulators that are in use today require input voltage shifts on the order of 1V to obtain full extinction. However it is extremely advantageous in terms of noise performance for modulators to operate at lower drive voltages. Many sensors and antennas generate only millivolts or less. As a result it is often necessary to include an amplifier in conventional optical transmission systems, which often limits system performance. By using silicon nano-slot waveguide designs and optical polymers, it is possible today to construct millivolt-scale, broadband modulators. In some embodiments, a millivolt-scale signal is one having a magnitude in the range of hundreds of millivolts down to units of millivolts. Using novel nanostructured waveguide designs, we have demonstrated a 100× improvement in V$\pi$ over conventional electro-optic polymer modulators.

A variety of physical effects are available to produce optical modulation, including the acousto-optic effect, the Pockels effect either in hard materials, such as lithium niobate or in electro-optic polymers, free-carrier or plasma effects, electro-absorption, and thermal modulation. For many types of optical modulation, the basic design of a modulator is similar; a region of waveguide on one arm of a Mach-Zehnder interferometer is made to include an active optical material that changes index in response to an external signal. This might be, for instance, a waveguide of lithium niobate, or a semiconductor waveguide in silicon. In both cases, a voltage is introduced to the waveguide region by means of external electrodes. This causes the active region to shift in index slightly, causing a phase delay on the light traveling down one arm of the modulator. When the light in that arm is recombined with light that traveled down a reference arm, the phase difference between the two signals causes the combined signal to change in amplitude, with this change depending on the amount of phase delay induced on the phase modulation arm. Other schemes, where both arms are modulated in order to improve performance, are also common.

Figure 13:
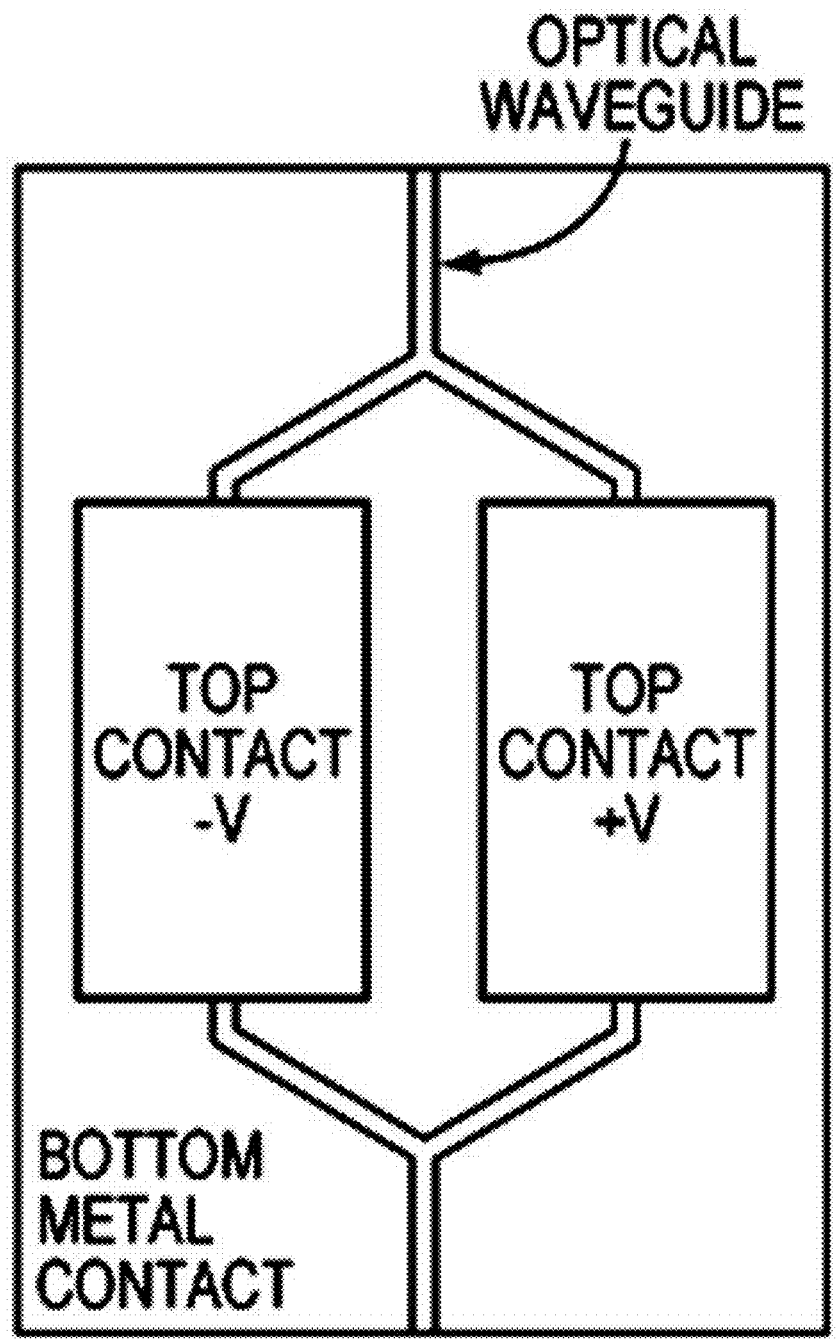
FIG. 13 shows a diagram of a Mach-Zehnder modulator with a conventional electrode geometry in top-down view, including top contact, waveguide, and bottom contact layers.

The measure of the strength of a modulation effect is how much phase shift is obtained for a given input voltage. Typical conventional modulators obtain effective index shifts on the order of 0.004% for 1 V. This implies that a Mach-Zehnder 1 cm in length, meant to modulate radiation near 1550 nm, would require 1 V of external input for the arms to accumulate a relative phase shift of $\pi$ radians. The half wave voltage $V_\pi$ (or $V_{pi}$) is the voltage needed for an interarm phase shift of $\pi$ radians (or 180 degrees). Lower values for $V_\pi$ imply that less power is needed to operate the modulator. Often, the responsivity, a length-independent product $V_\pi$–L is reported. Typical $V_\pi$–L values are in the range of 8 Vcm in silicon, or 6 V-cm for lithium niobate modulators. This voltage-length product, or responsivity, is an important figure of merit for examining a novel modulator design. Making a modulator physically longer generally trades lower halfwave voltage against reduced operating frequency and higher loss. Because generating high-speed and high-power signals requires specialized amplifiers, particularly if broadband performance is required, lowering the operating voltage of modulators is extremely desirable, particularly for on-chip integrated electronic/photonic applications, (including chip-to-chip interconnects) where on-chip voltages are limited to levels available in CMOS. FIG. 13 shows a diagram of a Mach-Zehnder modulator with a conventional electrode geometry.

FIG. 13 is a top-down view of a simple conventional Mach-Zehnder polymer interferometer, showing top contact, waveguide, and bottom contact layers. Such a device is usually operated in 'push/pull' mode, where either opposite voltages are applied to the different arms, or where the two arms are poled in opposite directions to achieve the same effect.

In the past several years, silicon has gained attention as an ideal optical material for integrated optics, in particular at telecommunications wavelengths. Low loss optical devices have been built, and modulation obtained through free carrier effects. One of the waveguides that can be supported by silicon is the so-called slot waveguide geometry. This involves two ridges of silicon placed close to each other, with a small gap between them. We have demonstrated modulation regions based on filling this gap with a nonlinear material, and using the two waveguide halves as electrodes. In such a geometry, the silicon is doped to a level that allows electrical conductivity without causing substantial optical losses. This allows the two wires or ridges to serve both as transparent electrical contacts and as an optical waveguide.

Using slot waveguides, we previously obtained an improvement in modulation strength of nearly 5× when compared to the best contemporary conventional waveguide geometries with electrodes separated from the waveguide, with the initial, non-optimized designs. This improvement was based on the remarkably small width of the gap across which the driving voltage drops. It is expected that smaller gaps translate into higher field per Volt, and the Pockels Effect depends on the local strength of the electric field. The smaller the gap, the larger the index shift. A unique property of slot waveguides is that, even as these gaps become nanoscale, the divergence conditions on the electric field require that much of the optical mode remains within the central gap. As a result, changing the index within a nanoscale gap can give a remarkably large change in the waveguide effective index. Because of these divergence conditions, the optical mode's effective index is largely determined by the shift found even in very small gaps.

Low $V_\pi$ Modulators

Several major approaches toward achieving low $V_\pi$ modulation have recently been pursued. The free-carrier dispersion effect in silicon waveguides has been used. Green et al. achieved a $V_\pi$ of 1.8 V with this effect. Modulators based on lithium niobate are also frequently used. Typical commercially obtained $V_\pi$ values are 4 V. Recently, Mathine and co-workers have demonstrated a nonlinear polymer based modulator with a $V_\pi$ of 0.65 V. For the devices produced by others, the attained values of $V_\pi$ are large.

A number of approaches have been proposed for developing low $V_\pi$ modulators. Different proposed approaches rely on the development of new electrooptic materials, or on optical designs that trade bandwidth for sensitivity, either through the use of resonant enhancement, or through dispersion engineering. The designs presented herein are based upon conventional, high-bandwidth Mach-Zehnder traveling wave approaches, but achieve appreciable benefits from using nano-slot waveguides. Of course, these designs can also take advantage of the newest and best electrooptic polymers. In principle, any material that can be coated conformally onto the surface of the silicon waveguides and that is reasonably resistive could be used to provide modulation in these systems, making the system extremely general.

The most recent nonlinear polymers achieve a high nonlinear coefficient, expressed as an $r_{33}$ of 500 pm/V. Using this in combination with the high susceptibilities described above, it is believed that it is possible today to construct a 1 cm Mach-Zehnder modulator with a $V_\pi$ of 8 mV. This corresponds to a ring resonator with a tuning sensitivity of 795 GHz/V. Both of these values are two orders of magnitude better than the performance obtained by current approaches. Current commercially available modulators typically have $V\pi$'s from 1 to 9 V, and current tunable electro-optic polymer based resonators achieve 1 GHz/V of tunability. If the $r_{33}$ value of 33 pm/V demonstrated by Tazawa and Steier for conventional polymer designs is used, then a $V_\pi$ of 64 mV and a resonator tunability of 50 GHz/V are obtained.

Segmented waveguide contact structures can be formed that allow very low resistance electrical contact to slot waveguides. We have described above, in similar circumstances, electrical contact to waveguides can be established via segmented waveguides. See FIG. 12B and FIG. 12D and the discussion related thereto. When the RC circuits implied by the segmentation geometry and the gap are examined, it is found that RC turn on times on the order of 200 GHz or more are achievable. Because the nonlinear polymers exhibit an ultrafast nonlinearity, these waveguide geometries present a path to making Terahertz scale optical modulators. Because the modulation is so strong, it is also possible to trade the length of the modulator against $V_\pi$. For example, our optimal geometry is expected obtain a $V\pi$ of 0.6 V with a 100 µm long Mach-Zehnder modulator. This device is expected be exceptionally simple to design for 10 GHz operation, as it could likely be treated as a lumped element. We have shown above that lateral contact structures with low loss and low resistance can be constructed with these slot waveguides. See FIG. 12B and FIG. 12D and the discussion related thereto.

We believe these nano-slot waveguide designs present a path to realizing very high speed, low voltage modulators. It is advantageous to be able to attain a responsivity $V_\pi$–L of less than 1 V-cm. The physical principles involved in such devices are based on employing a nonlinear material of at least moderate resistivity, and a high index contrast waveguide with tight lithographic tolerances. Therefore, it is expected that nano-slot waveguides, either as Mach-Zehnder or ring-based devices, are likely an advantageous geometry for optical modulation with nonlinear materials in many situations. In addition, materials compatibility and processing issues are greatly reduced for such devices compared to conventional multilayer patterned polymer modulator structures.

These high index contrast devices have (or are expected to have) extremely small bend radii, which are often orders of magnitude smaller than corresponding all-polymer designs with low loss and high Q. These geometric features translate into extremely high free spectral ranges for ring modulators, compact devices, and wide process latitudes for their fabrication. Given the inexpensive and readily available foundry SOI and silicon processes available today, and the commercial availability of electron beam lithography at sub-10 nm line resolution, it is expected that slot-waveguide based modulators are likely to replace conventional modulators in many applications in the coming years.

Waveguide Geometries

Figure 14:
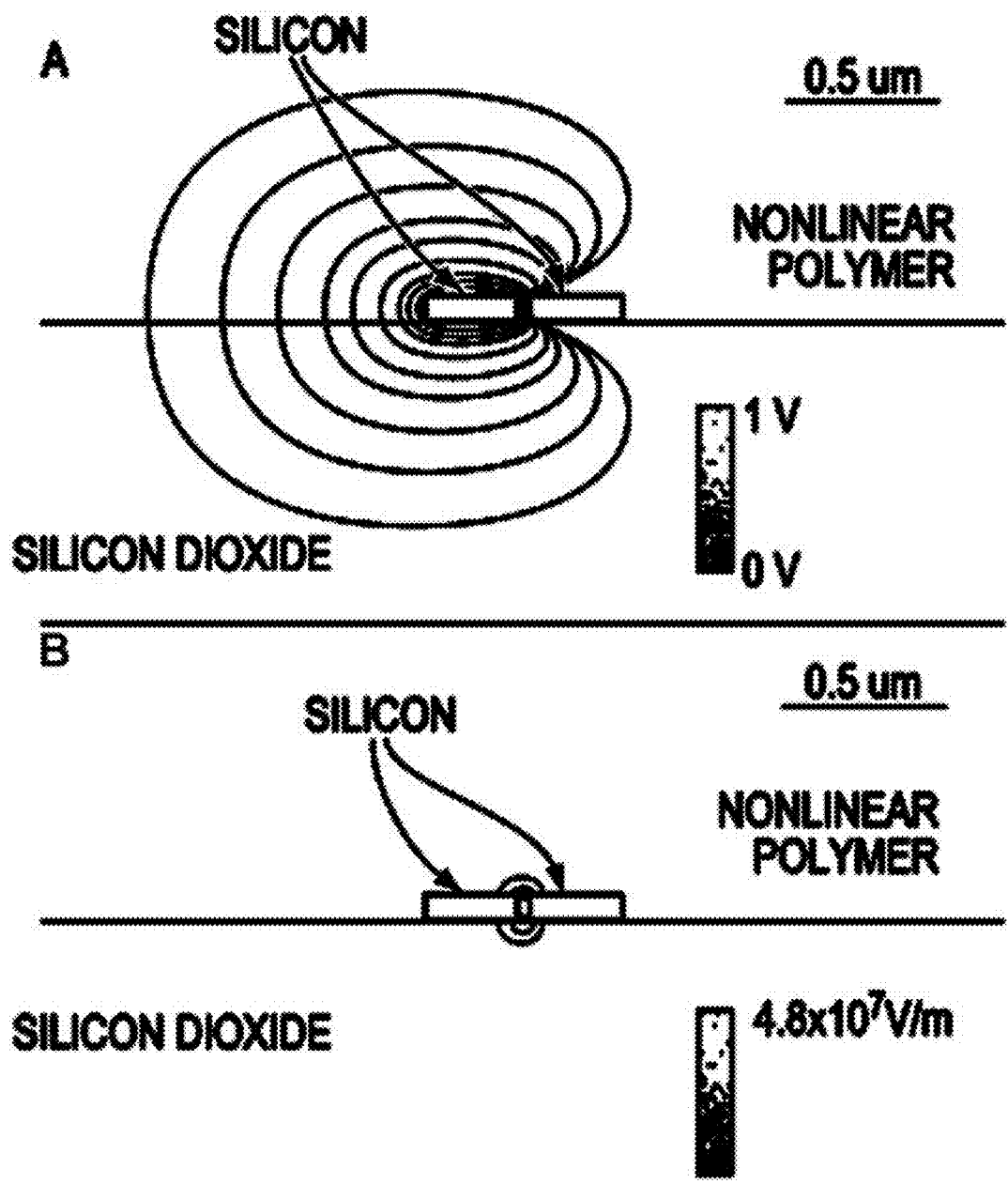
FIG. 14A shows the static voltage potential field distribution due to charging the two electrodes.
FIG. 14B shows the electric field due to the potential distribution. |E| is plotted in increments of 10%.

We now describe several different waveguide geometries, and show the effective index susceptibility as a function of the slot sizes of the waveguide. The susceptibilities are calculated near a 1550 nm free space wavelength. However, the values obtained will not vary much from 1480 nm to 1600 nm as the modal pattern does not change significantly. In the embodiments described, the waveguides are composed of silicon, and assumed to rest on a layer of silicon dioxide. The top cladding is a nonlinear polymer with an index of 1.7. This is similar to the waveguide geometry that we have used in our modulation work described hereinabove. FIG. 14 shows the static electric fields solved as part of analyzing waveguide design 1 with a gap of 40 nm, as described in Table 2. As one would expect, the field is nearly entirely concentrated inside the slot area. The field shown was calculated assuming a voltage difference of 1 Volt. It is slightly larger than simply the reciprocal of the gap size due to the singular nature of the solution to Poisson's equation near the corners of the waveguide.

FIG. 14A and FIG. 14B illustrate solved field patterns for the analysis of waveguide 1 at a 40 nm gap. FIG. 14A shows the static voltage potential field distribution due to charging the two electrodes. FIG. 14B shows the electric field due to the potential distribution. |E| is plotted in increments of 10%.

We have constrained ourselves to use waveguide geometries that have minimum feature sizes of at least 20 nm. These are near the minimum feature sizes that can be reliably fabricated using e-beam lithography. Table 2 lists a description of each type of waveguide studied. Each waveguide was studied for a number of different gap sizes. In all cases, the maximum susceptibility was obtained at the minimum gap size. The maximum gap size studied and the susceptibility at this point are also listed. In some cases, the study was terminated because at larger gap sizes, the mode is not supported; this is noted in Table 2. For multislot waveguide designs where there are N arms, there are N–1 gaps; the design presumes that alternating arms will be biased either at the input potential or ground.

Table 2 shows the effective index susceptibility for various waveguide designs. The susceptibility is approximately inversely proportional to gap size.

It is clear that within the regime of slotted waveguides, it is always advantageous to make the slot size smaller, at least down to the 20 nm gap we have studied. This causes the DC electric field to increase, while the optical mode tends to migrate into the slot region, preventing any falloff due to the optical mode failing to overlap the modulation region.

TABLE 2

| Waveguide Design | Waveguide Height (nm) | Arm Sizes (nm) | Maximum $\gamma$ ($\mu m^{-1}$) | Minimum $\gamma$ ($\mu m^{-1}$) |
|---|---|---|---|---|
| 1 | 100 | 300, 300 | 1.3, 20 nm gap | .40, 140 nm gap |
| 2 | 150 | 300, 300 | 1.6, 20 nm gap | .68, 120 nm gap |
| 3 | 200 | 300, 300 | 2.3, 20 nm gap | .74, 120 nm gap |
| 4 | 100 | 400, 400 | 1.1, 20 nm gap | .67, 60 nm gap, modal limit |
| 5 | 100 | 250, 250 | 1.2, 20 nm gap | .56, 60 nm gap, modal limit |
| 6 | 100 | 300, 40, 300 | 1.6, 20 nm gap | .53, 80 nm gap, modal limit |
| 7 | 100 | 300, 40, 40, 300 | 1.9, 20 nm gap | .76, 60 nm gap, modal limit |
| 8 | 200 | 200, 40, 200 | 3, 20 nm gap | 1.4, 60 nm gap, modal limit |
| 9 | 300 | 300, 300 | 2.5, 20 nm gap | 2.5, 20 nm gap, modal limit |
| Steier et al. | N/A | N/A | .026, 10 $\mu$m gap | N/A |

In examining the results of our calculations, it is useful to calculate the maximum susceptibilities that can be obtained. For an effective index of about 2, which is approximately correct for these waveguides, and a gap size of 20 nm, the maximum achievable $\gamma$ is approximately 12.5 $\mu m^{-1}$. Thus, for a gap size of 20 nm, waveguide design 8 is already within 25% of the theoretical maximum value.

It is also worth noting the corresponding $\gamma$ value that can be obtained by calculation using our methods for the separated electrode approach of Steier. The effective index of the mode is expected to be about 1.8, and the gap distance for the dc field is 10 um. Under the most optimistic assumptions about mode overlap with the active polymer region (that is, assuming complete overlap), this corresponds to a $\gamma$ of about 0.03 $\mu m^{-1}$.

It is useful to calculate, given the current $r_{33}$ values that are available, the index tuning that might be achieved with these designs. The most advanced polymers now yield $r_{33}$ values of 500 pm/V. If a bulk refractive index of 1.7 is used, then a $\partial n/\partial V$ of 0.006 $V^{-1}$ is obtained with the best design given above. Using a waveguide with an effective index of 2 and a group index of 3, which are typical of silicon-polymer nano-slot waveguides, the $V_\pi$ for a Mach-Zehnder with a length of 1 cm is expected to be about 6 mV. The resonance shift that is expected to be obtained in a ring resonator configuration would be 380 GHz per volt. Both of these values represent orders of magnitude improvement in the performance of these devices compared to current designs.

Segmented Contacting

As we have shown empirically, silicon can be doped to about 0.025 $\Omega$-cm of resistivity with a n-type dopant without substantially increasing losses. Other dopants or perhaps other high index waveguiding materials may have even higher conductivities that can be induced, without significantly degrading optical performance. However, it is known that the conductivity cannot be increased endlessly without impacting optical loss.

This naturally presents a serious challenge for the issue of driving a slot waveguide of any substantial length. Consider a slot waveguide arm of length 1 mm, formed of our optimal design. The capacitor formed by the gap between the two electrodes is about 0.25 pF. The 'down the arm' resistance of the structure, however, is 4 M$\Omega$. Therefore, the turn on time of an active waveguide based on this is about 0.1 $\mu$S, implying a 10 MHz bandwidth.

A solution to this problem is presented by continuously contacting the waveguide via a segmented waveguide. This comprises contacting the two silicon ridges with a series of silicon arms. Even though the silicon arms destroy the continuous symmetry of the waveguide, for the proper choice of periodicity no loss occurs, and the mode is minimally distorted. This is because a Bloch mode is formed on the discrete lattice periodicity, with no added theoretical loss. Of course the performance of fabricated devices will be different from that of conventional slot waveguides due to fabrication process differences. We have previously demonstrated empirically that continuous electrical contact can be formed for non-slotted waveguide via segmentation with relatively low optical losses.

Figure 15:
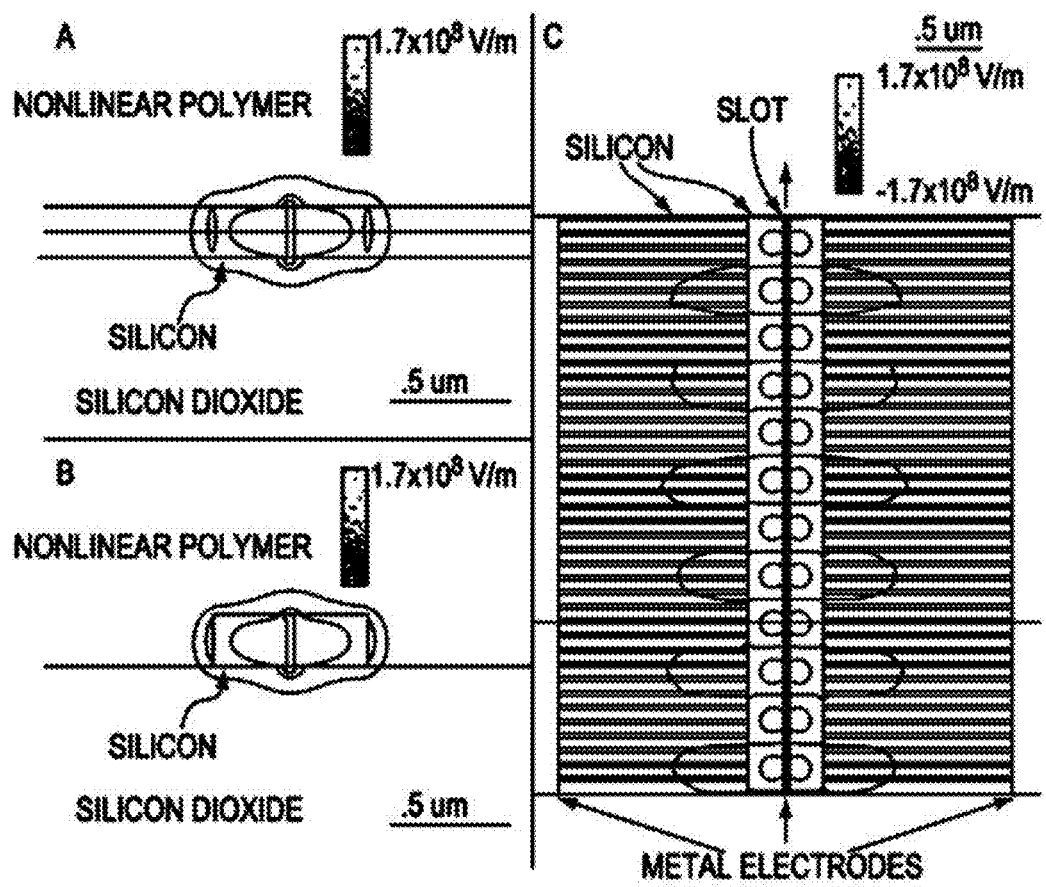
FIG. 15A shows a cross section of the segmented, slotted waveguide, with the |E| field plotted in increments of 10% of max value.
FIG. 15B shows a similar plot for the unsegmented waveguide.
FIG. 15C shows a horizontal cross section of the segmented, slotted waveguide in which Re(Ex) is plotted in increments of 20% of max.

Here we present a simulation of a particular segmentation geometry for our optimal slot waveguide design, that with 200 nm tall and 300 nm wide arms and a gap of 20 nm. We have found that a segmentation with 40 nm arms, and a periodicity of 100 nm, appears to induce no loss or significant mode distortion in the waveguide. Around 2 um of clearance appears to be needed from the edge of the segmented waveguide to the end of the arms. FIG. 15A, FIG. 15B and FIG. 15C show plots of several cross sections of the segmented slot waveguide with a plot of the modal pattern overlaid. For comparison, a cross section of the unsegmented slot waveguide is presented as well. Simulations were also performed to confirm that the index shift formula continued to apply to the segmented slotted waveguide. It was found that the index shift was in approximate agreement with the value predicted for the non-segmented case. Non-segmented modesolvers were used for the rest of the simulations in this work, because simulation of the segmented designs is radically more computationally burdensome than solving for the unsegmented case, as they require solving for the modes of a 3d structure. Since the index shifts for the unsegmented and segmented cases are extremely similar, solving for the modes in the unsegmented cases is adequate for purposes of design and proof-of-concept.

FIG. 15A shows a cross section of the segmented, slotted waveguide, with the |E| field plotted in increments of 10% of max value. FIG. 15B shows a similar plot for the unsegmented waveguide. FIG. 15C shows a horizontal cross section of the segmented, slotted waveguide; Re(Ex) is plotted in increments of 20% of max. In an actual device, some sort of metal based transmission line would undoubtedly provide the driving voltage for the waveguide. The metal electrodes that would likely form part of this transmission line have been noted in FIG. 15C. In all cases the mode has been normalized to have 1 Watt of propagating power. FIG. 15A and FIG. 15C show the location of the other respective cross section as a line denoted C in FIG. 15A and A in FIG. 15C.

Assuming a 0.025 Ω-cm resistivity, one can calculate the outer arm resistance as 63 kΩ per side per period, while the inner arm resistance is 25 kΩ per side per period. The gap capacitance per period is $2.5 \times 10^{-17}$ Farads. This implies a bandwidth on the order of 200 GHz.

We now describe an electro-optic modulator fabricated from a silicon slot waveguide and clad in a nonlinear polymer. In this geometry, the electrodes form parts of the waveguide, and the modulator driving voltage drops across a 120 nm slot. As a result, a half wave voltage of 0.25 V is achieved near 1550 nm. This is one of the lowest values for any modulator obtained to date. As the nonlinear polymers are extremely resistive, our device also has the advantage of drawing almost no current. It is believed that this type of modulator could operate at exceedingly low power.

A unique advantage with nonlinear polymers is that an integrated optical circuit can be conformally coated by a nonlinear polymer. This property, when combined with a slot waveguide, enables the construction of a uniquely responsive modulator. We describe the use of a push-pull Mach-Zehnder modulator configuration in which each arm has an opposing bias, leading to an opposing phase shift.

Figure 16:
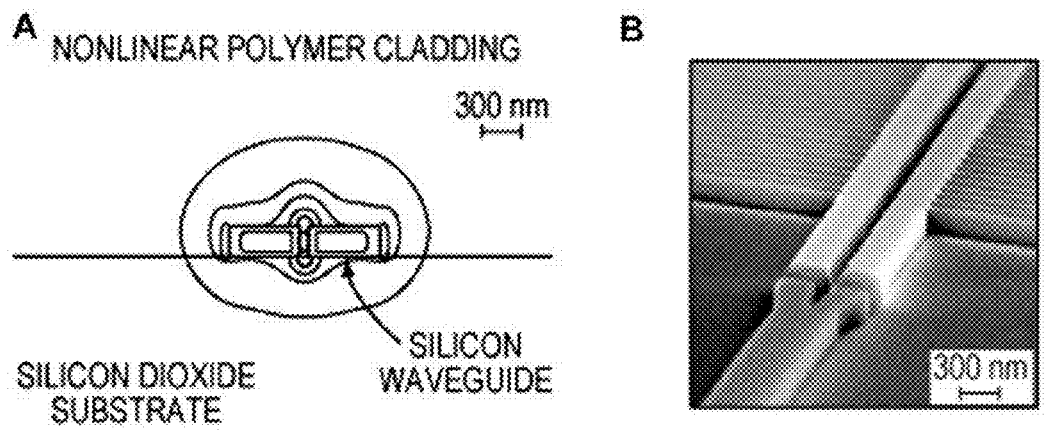
FIG. 16A is a diagram of the silicon slot waveguide used in the Mach-Zehnder modulator, according to principles of the invention.
FIG. 16B is an SEM micrograph of a slot waveguide, according to principles of the invention.

FIG. 16A shows the slot waveguide used for the Mach-Zehnder modulator. The modal pattern near 1550 nm is plotted, and contours of |E| are shown. FIG. 16B is an SEM micrograph of a slot waveguide. In this case, the slot waveguide is being coupled to with a ridge waveguide; this mode converter involves tiny gaps which ensure electrical isolation between the two arms. Contacting arms are also present around 3 μm from the ridge/slot junction. The dimensions are two 300×100 nm arms separated by a 120 nm slot.

Nonlinear polymers typically have very high resistivity of $10^{11}$ Ωcm. As a result, the two silicon arms are electrically isolated and can be used as modulator electrodes. The voltage drop between the arms occurs across a 120 nm electrode spacing, as opposed to the 5-10 μm that is typically required for modulators involving a nonlinear polymer and metallic contacts. This is a fundamental advantage that slot waveguide geometries have for electro-optic modulation.

It is advantageous to contact the silicon arms with an external electrode throughout the length of the Mach-Zehnder device to minimize parasitic resistances. We use a segmented waveguide in which a periodic set of small arms touches both waveguide arms. We use a segmentation with a periodicity of 0.3 μm and arm size of 0.1 μm that is largely transparent to the optical mode.

Figure 17:
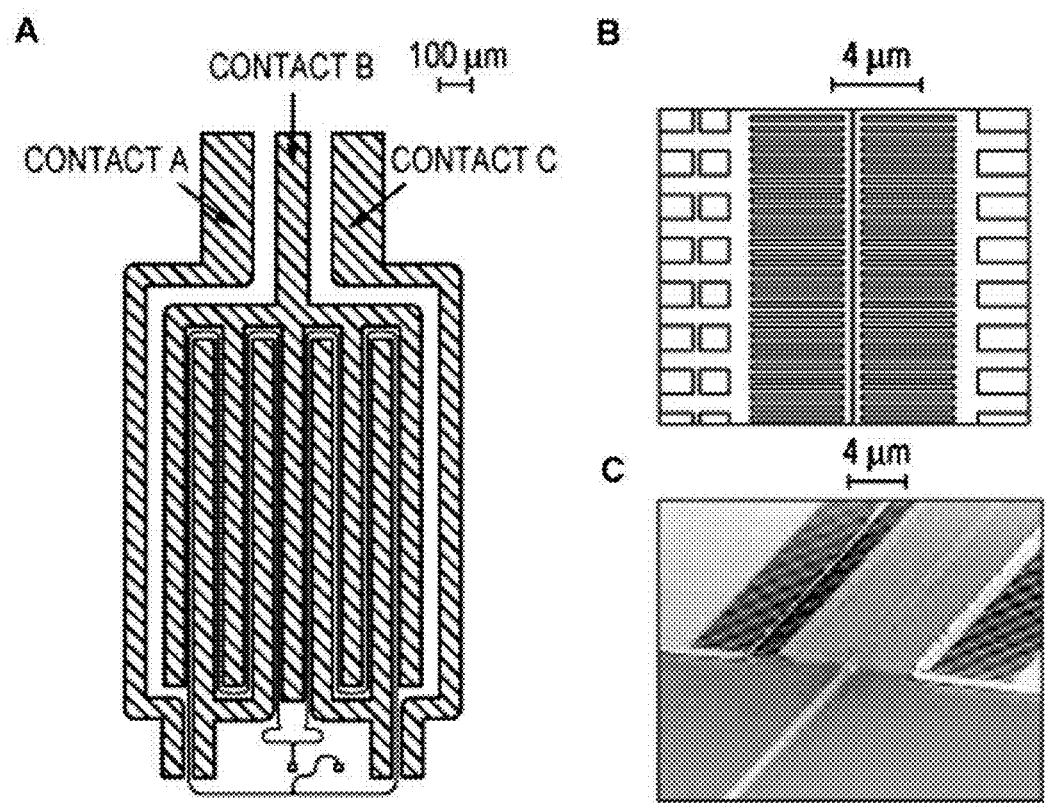
FIG. 17A is a diagram of the modulator layout, according to principles of the invention.
FIG. 17B and FIG. 17C are two SEM micrographs of modulators constructed according to principles of the invention, that show the slotted, segmented region, as well as the location where the silicon makes contact with the electrical layer.

Because the polymer has a second order nonlinearity, a Mach-Zehnder modulator can be operated in push-pull mode, even with no dc bias, effectively doubling the modulator response. FIG. 17A is a diagram of the modulator layout, in which contacts A, B, and C are shown. FIG. 17B is a diagram and FIG. 17C is a SEM micrograph that show the slotted, segmented region, as well as the location where the silicon makes contact with the electrical layer.

Referring to FIG. 17A, there are three regions in the modulator that are capable of maintaining distinct voltages. During poling operation, contact A is given a voltage of $2V_{pole}$, contact B a voltage of $V_{pole}$, and contact C is held at ground. To achieve a poling field of 150 V/μm, $V_{pole}$ was 18 V. This has the effect of symmetrically orienting the polymer in the two Mach-Zehnder arms. During device operation, contact B is driven at the desired voltage, while contacts A and C are both held at ground, leading to asymmetric electric fields in the two arms for a single bias voltage. This is the source of the asymmetric phase response. Electrical regions A and C cross the waveguide by means of a slotted ridged waveguide. At the ridge to slot mode converter, a small gap is left that maintains electrical isolation but is optically transparent. This enables the device to be built without requiring any via layers. A driving voltage from a DC voltage source was applied to contact B, while contacts A and C were held at ground.

Figure 18:
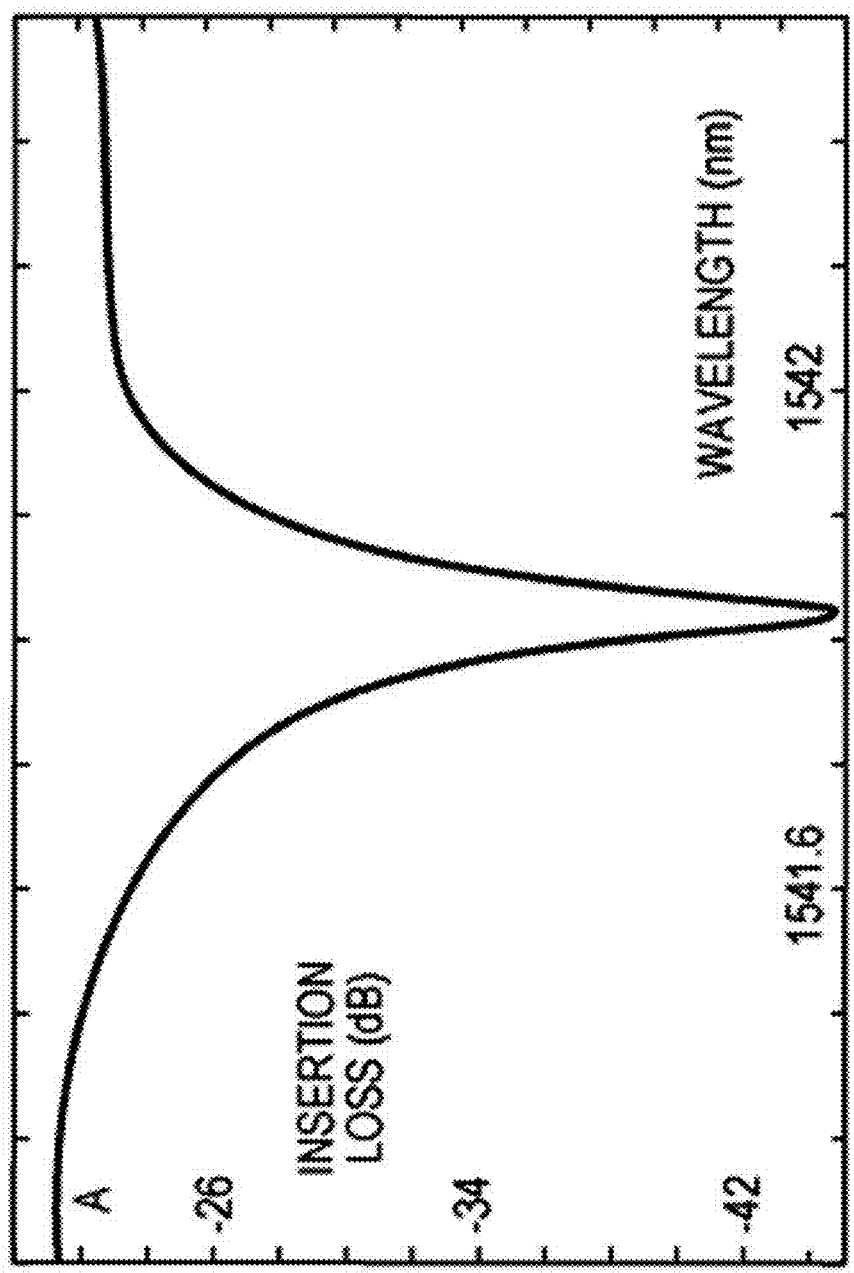
FIG. 18 is a diagram that shows a transmission spectrum of an electroded slot waveguide resonator with a gap of 70 nm. Fiber to fiber insertion loss is plotted in dB, against the test laser wavelength in nm.

We have recently demonstrated empirically that slot sizes of around 70 nm can be fabricated in 110 nm SOI as ring resonators with electrical contacts. FIG. 18 is a diagram that shows a transmission spectrum of an electroded slot waveguide resonator with a gap of 70 nm. Fiber to fiber insertion loss is plotted in dB, against the test laser wavelength in nm. We have also confirmed through electrical measurements that the two halves of the slots are largely electrically isolated.

We believe that there is the possibility of constructing even narrower slot waveguides, on the scale of 1-5 nm in thickness.

For example, one could use epitaxial techniques to grow a horizontal slot structure (rather than the vertical structures we have explored thus far) with an active, insulating material, with silicon beneath and above. This could be done in a layer form analogous to SOI wafer technology, in which a very thin layer of electroactive material such as the polymers we have described herein could be introduced. Such structures offer the possibility of yet another order of magnitude of improvement in the low-voltage performance of modulators. We anticipate our slot structures to be fairly robust even in the presence of fabrication errors. Fabrication imperfections may cause some of the narrower slots to have tiny amounts of residual silicon or oxide in their centers, or to even be partially fused in places. As long as electrical isolation is obtained, and the optical loss is acceptable, we would expect the slot performance to decrease only in a linear proportion to the amount of the slot volume that is no longer available to the nonlinear polymer cladding.

The description provided herein may be augmented by the descriptions provided in the following patents and pending patent applications: U.S. Pat. Nos. 7,200,308, 7,424,192, U.S. Patent Application Publication No. 200910022445A1, U.S. patent application Ser. No. 12/167,063, PCT/US2009/33516, and PCT/US2009/36128.

Generation of Terahertz Radiation

The applications of Terahertz radiation, roughly defined as electromagnetic radiation with a frequency ranging from 0.5-10 THz, are a topic of active research. They include medical imaging, remote sensing, chemical detection, and tactical imaging. One significant impediment in this field is the expense and complexity associated with Terahertz sources. Current methods for generating THz frequencies include using spectrometers to filter blackbody radiation, pulsed lasers combined with nonlinear optical materials to exploit difference frequency generation, quantum cascade lasers, and high frequency microwave mixers among others. Another recent approach has been to combine quantum cascade lasers and difference frequency generation. Some recent work on Terahertz devices has focused on metamaterials, which may enable switching and control of Terahertz radiation, but this has not yet resulted in significant progress on new Terahertz sources. All of the aforementioned methods of generating Terahertz radiation suffer from either very low operating temperatures, lack of tunability, very low power output, or can only function in pulsed mode. The majority of current approaches to Terahertz generation in fact suffer from several of these problems.

Current approaches to using $\chi^2$ nonlinearities suffer from low conversion efficiencies. This is due in part to the fact that Terahertz modes must have relatively large lateral dimensions, as well as the fact that nonlinear frequency conversion is inherently less efficient when the output is at lower frequencies. That is why current approaches generally require pulsed lasers. Several recent developments have made possible a new approach to difference frequency generation, however. First, it has become possible to guide optical modes with relatively low loss in small, high index contrast, ridge waveguides. Realizations in SOI, for example, achieve 7 dB/cm of loss in a 0.5×0.1 μm waveguide. Second, nonlinear polymers have become increasingly powerful, with an $r_{33}$, the standard metric of nonlinearity, of 170 pm/V already demonstrated. It is expected that a further 3× improvement will be possible, with $r_{33}$ values that will approach 500 pm/V, about an order of magnitude stronger than typical nonlinear crystals. While these nonlinear polymers are typically used for electrooptic modulation, we have shown unambiguously that the nonlinearity is ultrafast.

We describe herein an all-optical terahertz generator and a terahertz waveguide. Such a device is expected to be useful as a practical ultrafast generator of terahertz electromagnetic signals. The generation of terahertz frequencies using two light beams (or electromagnetic radiation beams) as input in silicon-polymer integrated waveguide devices is based upon the all-optical Kerr Effect, the same ultrafast effect used in four-wave mixing. It is also expected that the integrated silicon system described will allow the interconnection of the all-optical generator with electronic systems for interfacing the all-optical generator with more conventional electronic systems, for example to provide user input and output capabilities.

By integrating optical polymers through evanescent coupling to high-mode-confinement silicon waveguides, the effective nonlinearity of the waveguide is greatly increased for cross-phase modulation. The combination of high mode confinement, multiple integrated optical components, and high nonlinearities produces all-optical ultrafast devices operating at power levels compatible with telecommunication systems. These devices are a first step toward large scale integrated ultrafast optical logic in silicon. They operate at frequencies that are two orders of magnitude faster than present silicon devices.

High index contrast waveguides as described herein are useful to concentrate light in order to enhance nonlinear optical effects in various materials so that such effects can be employed to manipulate light (or more generally electromagnetic radiation) at low power levels, as compared to conventional systems and methods that employ nonlinear optical materials. The manipulation of electromagnetic radiation or light can be useful to provide a variety of components that perform operations on light such as rectification and logic operations in a manner analogous to the same operations which are provided using electronic devices operating on electrical signals. For example, an input a light wave to be processed is impressed onto the component. The light wave has at least one parameter characterizing the light wave, such as one of an intensity, a polarization, a frequency, a wavelength, and a duration (e.g., a pulse length, or in the case of continuous wave light, an effectively infinite duration). After the input light wave is processed (or interacts with the waveguide and the clad nonlinear optical material adjacent to the waveguide), an output signal is observed. In a circumstance where the input signal has been processed, the output signal has at least one parameter that is different from at least one parameter characterizing the input light wave, including possibly an electrical output signal when the input light wave had no electrical signal component (e.g., optical rectification).

As described in greater detail herein, the present invention provides methods and structures that exhibit enhancement of the nonlinear effects in various electro-optical materials that is sufficient to make the nonlinear effects accessible with continuous-wave, low-power lasers. As is described herein the waveguide is coated or clad with another material which provides or exhibits an enhanced nonlinear optical coefficient, such as certain kinds of organic electro-optical materials that can be specifically designed to operate in various regions of the electromagnetic spectrum. It is to be understood that if the high contrast waveguide core material itself exhibits a sufficiently large nonlinear optical coefficient of the correct order, e.g., a $\chi^2$ or a $\chi^3$ coefficient, the cladding may be omitted and the waveguide core itself can provide the nonlinear optical effects of interest. We have demonstrated that some designs of high index contrast waveguides are designed to concentrate light in the cladding. In some embodiments, the waveguide is a split waveguide. In some embodiments, the split waveguide is coated with a material which provides an enhanced nonlinear optical coefficient. In some embodiments, the two sides of the split waveguide also comprise electrodes that are used for polling a $\chi^2$ material introduced into the gap. As described herein, in some embodiments, the dispersion of a waveguide is engineered to enhance the optical power in the mode by slowing the propagation of the light. In some embodiments the waveguides are segmented waveguides. As discussed herein, the waveguide can provide optical field enhancement when the structure is arranged into a resonator, which in various embodiments can be either a ring resonator or a linear resonator. It is believes that appropriate claddings can comprise one or more of glass, semiconductor, quantum dots, saturable absorbers, quantum dots doped into an organic mains, electro-optic materials such as polymers and dendrimers, polymers or other organic materials providing large $\chi^3$ coefficients, or other nonlinear optical material to provide large optical nonlinearities through field enhancement in the cladding. In some embodiments, the systems and methods of the invention can be used to provide a tunable infrared source. In some embodiments, by using a low power tunable laser and a high power fixed wavelength laser as the inputs, it is possible to produce a high power coherent tunable source. The tunable source can be a widely tunable coherent source. In addition, using systems and methods of the invention, the use of an incoherent input light source can result in an incoherent tunable source. With the provision of on-chip feedback, the systems and methods of the invention can be used to provide devices that exhibit optical self-oscillation. In some embodiments, the central high index waveguide comprises an amplifying medium, such as a gallium arsenide stripe laser. In some embodiments, where the cladding material exhibits nonlinearities, the laser can be operated as a pulsed source. In some embodiments, systems and methods of the invention can be constructed to provide optical logic functionality, such as optical AND or optical flip-flops. It is believed that systems and method according to the invention can be employed to create optical NAND, OR, NOR and XOR gates, and optical latches, or optical memory. In some embodiments, the systems of the invention can further comprise pump lasers integrated onto the same chip. In some embodiments, the systems of the invention can further comprise off-chip feedback or amplification for frequency conversion or pulse generation. In some embodiments, an additional electrical signal is coupled into the structure to provide active modelocking.

We have developed a set of tools for concentrating light to a high degree by using silicon or other high index contrast waveguides, and we have fabricated devices that demonstrate some of the many applications that can be contemplated when such nonlinear materials are exploited. In particular, by utilizing split waveguides, we are able to greatly enhance the optical fields in the cladding of a tightly confined waveguide, without greatly enhancing the optical losses of the same waveguide. Combining the high field concentrations available from the split waveguides with the high nonlinear activity of nonlinear optical polymers permits the development of nonlinear optical devices operating at much lower optical input power levels than are possible with conventional free space or chip based systems. We have demonstrated four-wave mixing (which is based upon $\chi^3$), as well as optical rectification (based on $\chi^2$), in such waveguides. Using these waveguides it is possible to decrease the power levels needed to observe significant nonlinearities to the point where, by contrast with conventional nonlinear optics, it can be done with non-pulsed, continuous wave lasers.

Examples of materials exhibiting Chi2 ($\chi^2$) and Chi3 ($\chi^3$) based optical effects that are believed to be suitable fro use in the present invention are given in U.S. utility application Ser. No. 11/503,503, filed Aug. 11, 2006, which application is hereby incorporated herein by reference in its entirety. See for example FIG. 22 and FIG. 23 of that application, and the associated descriptions of those figures.

We will now present a more detailed description of the systems and methods of the invention, including successively the mechanical structure of exemplary embodiments of high index waveguides, exemplary embodiments of cladding materials having large nonlinear constants $\chi^2$ and their incorporation into devices having high index waveguides, including exemplary results observed on some of the fabricated devices that are described.

Device Design

The theoretical description presented in U.S. Pat. No. 7,480,434, which is hereby incorporated herein by reference in its entirety, discusses some of the challenges of designing a Silicon Terahertz Generator (STG). These challenges relate to three areas. First, one needs to design waveguides that will guide both optical and Terahertz radiation, both without crippling losses. Second, one should attempt to optimize the modal overlap with the nonlinear materials to provide efficient difference frequency generation. Third, the waveguides should be designed so that phase matching conditions between the THz and NIR signals are met.

Silicon can be used to guide radiation in the near infrared. Silicon is relatively transparent in much of the Terahertz. In addition, because of silicon's high index, silicon waveguides can concentrate optical modes to areas of $\frac{1}{1,000}$ the size of the modes of ordinary optical fibers, and can be evanescently coupled to nonlinear optical polymers. Silicon microscale waveguides can be efficiently coupled both to free space and to fibers, and large-scale integrated photonic structures can be made using such waveguides.

Inexpensive, high power sources in the range of 1480-1600 nm have recently become widely available, due to demand from telecommunications applications. If one uses only pump sources within this frequency range, the frequencies available as a difference of the two sources range from DC to 15 THz. High power lasers are also available in specific bands in the 1300-1480 nm range. However, to our knowledge, single sources that are tunable across the entire range have not been demonstrated. Based on current laser and erbium doped fiber amplifier technology, one can expect to obtain approximately 0.5 W of CW laser power. This power can be expected to increase in the coming years.

Figure 19:
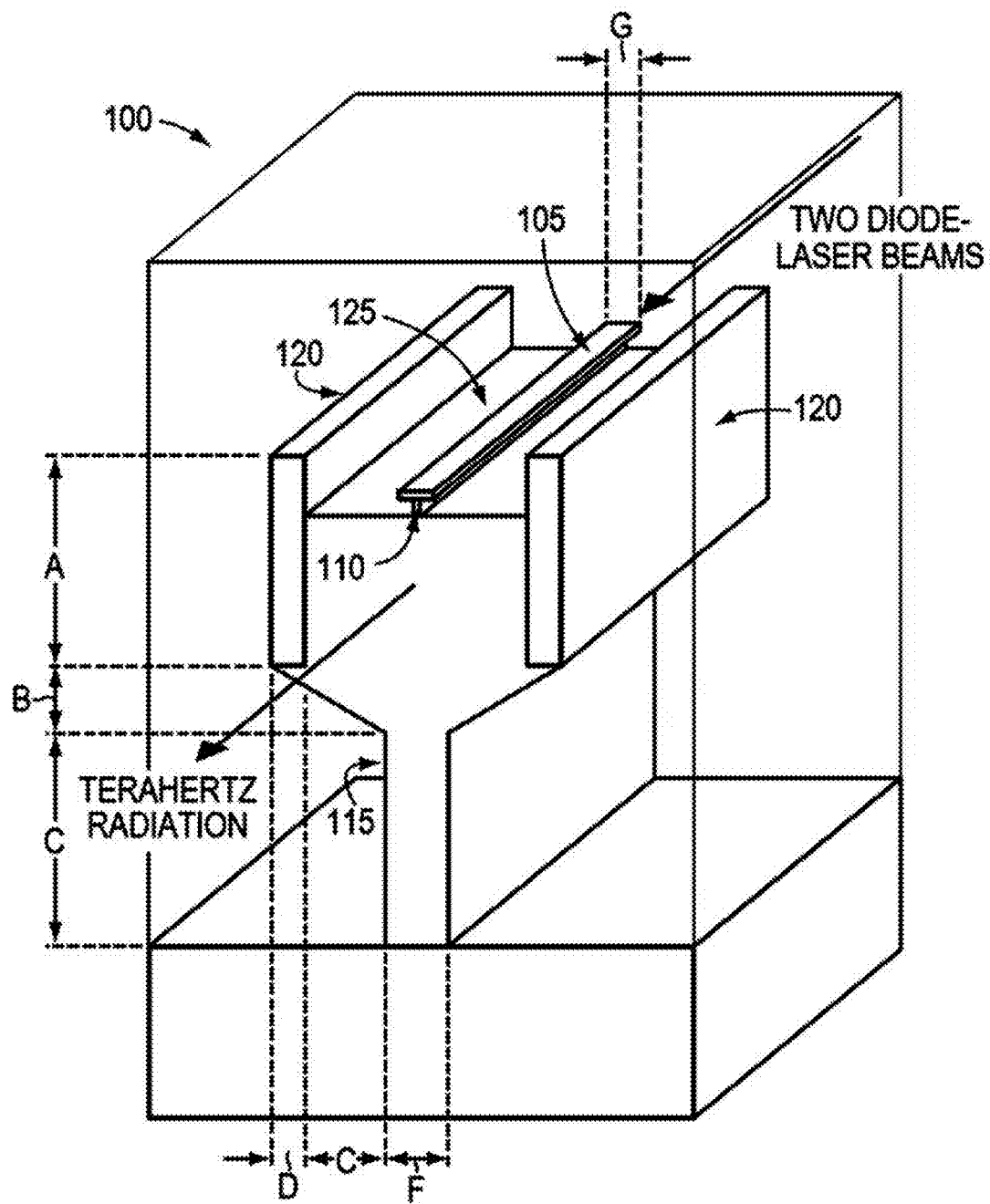
FIG. 19 is a schematic diagram of a Terahertz generation device, showing how the interaction of two beams of light in a waveguide comprising a material having a suitable nonlinear coefficient provides Terahertz radiation as on output.

One STG design presented in U.S. Pat. No. 7,480,434, and discussed herein, comprise a silicon core for guiding near-infrared (NIR) light, within a metal waveguide for confining Terahertz radiation. It is believed that optimal performance would be obtained from copper, but other metals, such as aluminum, silver, and gold, could be used. This basic geometry is shown in FIG. 19. A second-order optical nonlinearity, for example as exhibited by an organic polymer material, enables the two optical signals to mix and generate a difference frequency, and various dimensions can be optimized in order to achieve phase matching.

FIG. 19 is a schematic diagram 100 of the Terahertz generation device. An isometric view of the device is shown. A silicon waveguide 105 atop an oxide pillar 110 is supported by a bulk silicon pillar 115 that has been micromachined, for example using conventional silicon micro-electro-mechanical system (MEMS) technology. Adjacent the silicon pillar 115 and surrounding the silicon waveguide 105 on two sides is a conductive waveguide structure 120, which in one embodiment is expected to be made of a highly conductive metal such as copper. An organic polymer 125 that exhibits appreciable second-order optical nonlinearities can be provided as a cladding medium around the silicon waveguide 105, in order to enhance the nonlinear behavior and thereby improve wave mixing.

Figure 20:
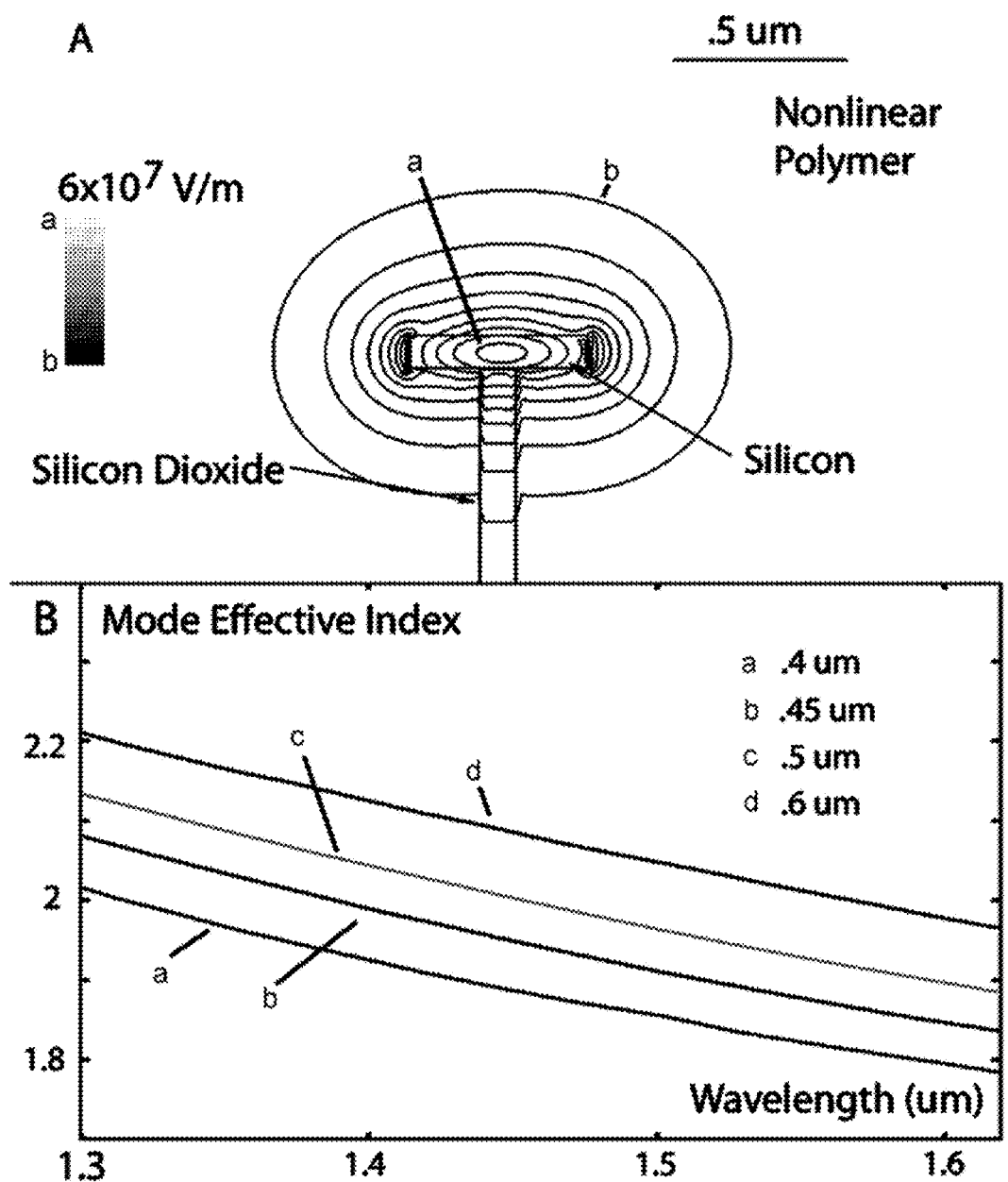
FIG. 20A is a diagram of the optical waveguide, with contours of the mode rendered in increments of 10% of |E| for 1 W of input power, according to principles of the invention.
FIG. 20B is a diagram showing dispersion diagrams as a function of waveguide width, according to principles of the invention.

The optical waveguide in the STG is shown in more detail in FIG. 20A. The optical waveguide comprises a strip of silicon 105 within a dual-strip conductive Terahertz waveguide 120. This entire structure is embedded in a cladding of electrooptic polymer 125 with a refractive index of 1.7. This waveguide geometry creates a significant evanescent near-infrared field, which overlaps with the polymer cladding. FIG. 20A shows the waveguide structure and the optical mode overlaid. The contours of the electric mode are rendered in increments of 10% of |E| assuming 1 W of input power. The waveguide used was 500 nm wide and 100 nm tall. The width of this waveguide is varied as a design parameter. The silicon wire waveguide is supported by a 100 nm wide pillar 110 of SiO$_2$. The effective indices of refraction from three different Si waveguide widths are presented in FIG. 20B, which also shows dispersion diagrams as a function of waveguide width. The modes were solved for using a Hermetian eigensolver such as that described by A. Taflove, *Computational Electrodynamics*, (Artech House, Boston. Mass., 1995). With such guides, phase matching for Terahertz modes with effective indices ranging from 2.8 to 3.2 is practical.

Similar optical waveguides have been shown to have losses of approximately 3.5 dB/cm, and are expected to be amenable to improvement in the future. From perturbation theory, the loss for the optical mode from interactions with the surrounding metal waveguide can be bounded to not exceed 3 dB/cm, and is generally significantly less. As typical device lengths for the nonlinear interaction region are expected to be below 2.5 mm, optical losses of even 10 dB/cm would not be expected to present a limitation.

It is expected that one can achieve two goals in the design of the Terahertz waveguide. First, we want to make the Terahertz mode more compact, since this maximizes the figure of merit. Second, we want a waveguide that will be relatively broadband. While spanning as much as 10 THz in the optical regime does not amount to a large fractional shift in frequency, the same is certainly not true in the Terahertz regime. As a result, we selected a design comprising a transmission line, since TEM modes often span frequency regimes of many orders of magnitude.

To span the maximum frequency range, two Terahertz waveguide designs (labeled waveguide I and waveguide II) have been presented. They are both similar to a conventional copper dual strip transmission line. However, the portion of the transmission line where the mode resides is partially filled with a plug of silicon, which is part of the supporting silicon pillar 115. The purpose of this feature is to raise the effective refractive index of the Terahertz mode, and to ensure that the phase matching condition is met.

The complex geometry of the Terahertz guide causes mode solving to become challenging. The modes were solved by launching the dual-strip transmission line pattern into a full 3d simulation, and observing the field pattern at various points down the waveguide. A steady-state analysis was used on the Yee grid. The discretization was 0.1 μm, and the run length was approximately 120 μm. From the relative uniformity and z behavior of the fields so obtained, it was clear to us that this method yielded the accurate modes. Once the modal pattern is known, the losses and effective indices of the modes were calculated via the relevant closed form expressions.

Figure 21:
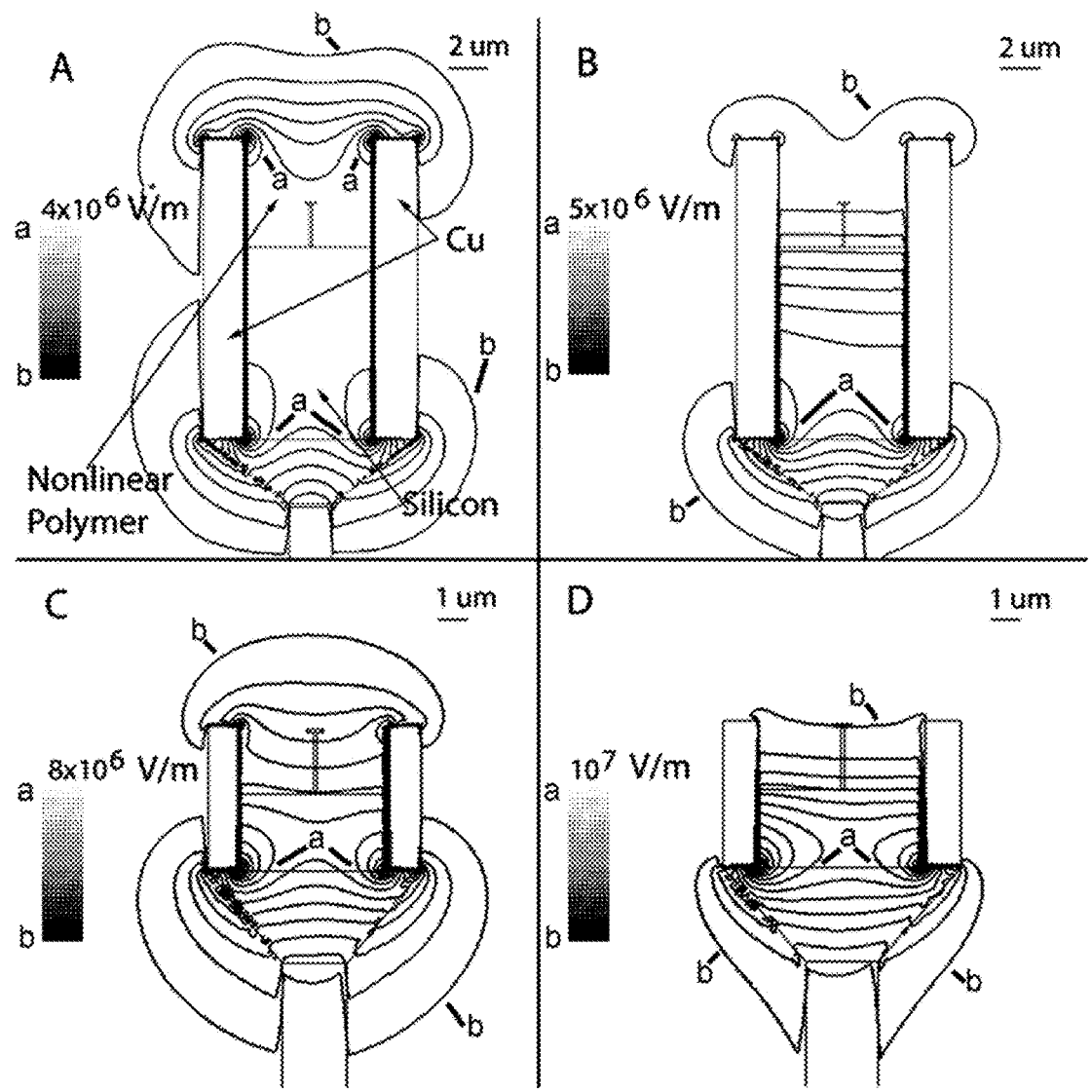
FIG. 21A and FIG. 21B are diagrams that illustrate Terahertz waveguide modal patterns for a first design (waveguide I), at frequencies 1 and 6 THz, respectively, for 1 W of propagating power, according to principles of the invention.
FIG. 21C and FIG. 21D are diagrams that illustrate Terahertz waveguide modal patterns for a second design (waveguide II), at 6 and 14 THz, respectively, according to principles of the invention.

FIG. 21A and FIG. 21B are diagrams that illustrate Terahertz waveguide modal patterns for a first design (waveguide I), at frequencies 1 and 6 THz, respectively, for 1 W of propagating power. FIG. 21C and FIG. 21D are diagrams that illustrate Terahertz waveguide modal patterns for a second design (waveguide II), at 6 and 14 THz, respectively. In all cases, the |E| field contours are plotted in increments of 5%. The maximum field in V/m is also indicated on a scale bar. This is for a mode with a time-average energy of 1 Watt. More information about the designs of waveguide I and waveguide II are presented in Table 3 hereinbelow.

Table 3 provides a description of Terahertz waveguides and device performances. In Table 3 columns A through F correspond to the dimensions shown in FIG. 19. The data in column C refers to the fact that this dimension is to exceed the specified value. Label G is not present in Table 3 as the optical waveguide width is varied independently.

TABLE 3

Description of Terahertz waveguides

| Terahertz waveguide type | A (μm) | B (μm) | C (μm) | D (μm) | E (μm) | F (μm) |
|---|---|---|---|---|---|---|
| I | 14 | 3.5 | >20 | 2 | 2 | 2 |
| II | 4.7 | 3 | >20 | 1 | 1.3 | 2 |

FIGS. 22A-22C are diagrams that illustrate characteristics of Terahertz waveguide modes, and output power. FIG. 22A shows the effective index of the Terahertz modes as a function of frequency. FIG. 22B shows the waveguide loss in dB/cm as a function of frequency. FIG. 22C shows the output power for devices described in Table 4 (hereinbelow), in dBm of output power versus the output frequency in THz.

In FIG. 22A and FIG. 22B, the modal patterns for Terahertz waveguides I and II are shown at various frequency extrema. At higher frequencies, the Terahertz mode tends to migrate into the region with more silicon. This has the deleterious effect of pulling the field away from the optical waveguide, and decreasing the generated power. The effective indices of the Terahertz waveguides are shown in FIG. 22B.

The waveguide loss of the Terahertz mode is highly frequency dependent. This is due to the effect of increased frequency on Ohmic losses, as well as frequency dependence of the mode pattern. The oxide pillar supporting the optical waveguide will not significantly impact the Terahertz mode loss, since the relevant mode overlap is very small. Bulk polymer losses as high as 30 dB/cm could be tolerated without significantly altering device performance. It is anticipated that future nonlinear polymers will easily meet this standard. Substrate leakage is not expected to be a major issue, provided that the support pillars are 20 μm or more in height. Even over three-dimensional simulations of 100 μm or more of waveguide, no substrate leakage is evident in such a configuration. While a small amount, perhaps less than 0.1 dB, might remain undetected in these models, this still provides an upper bound of 10 dB/cm, which is far less than the losses due to other sources.

Figure 22:
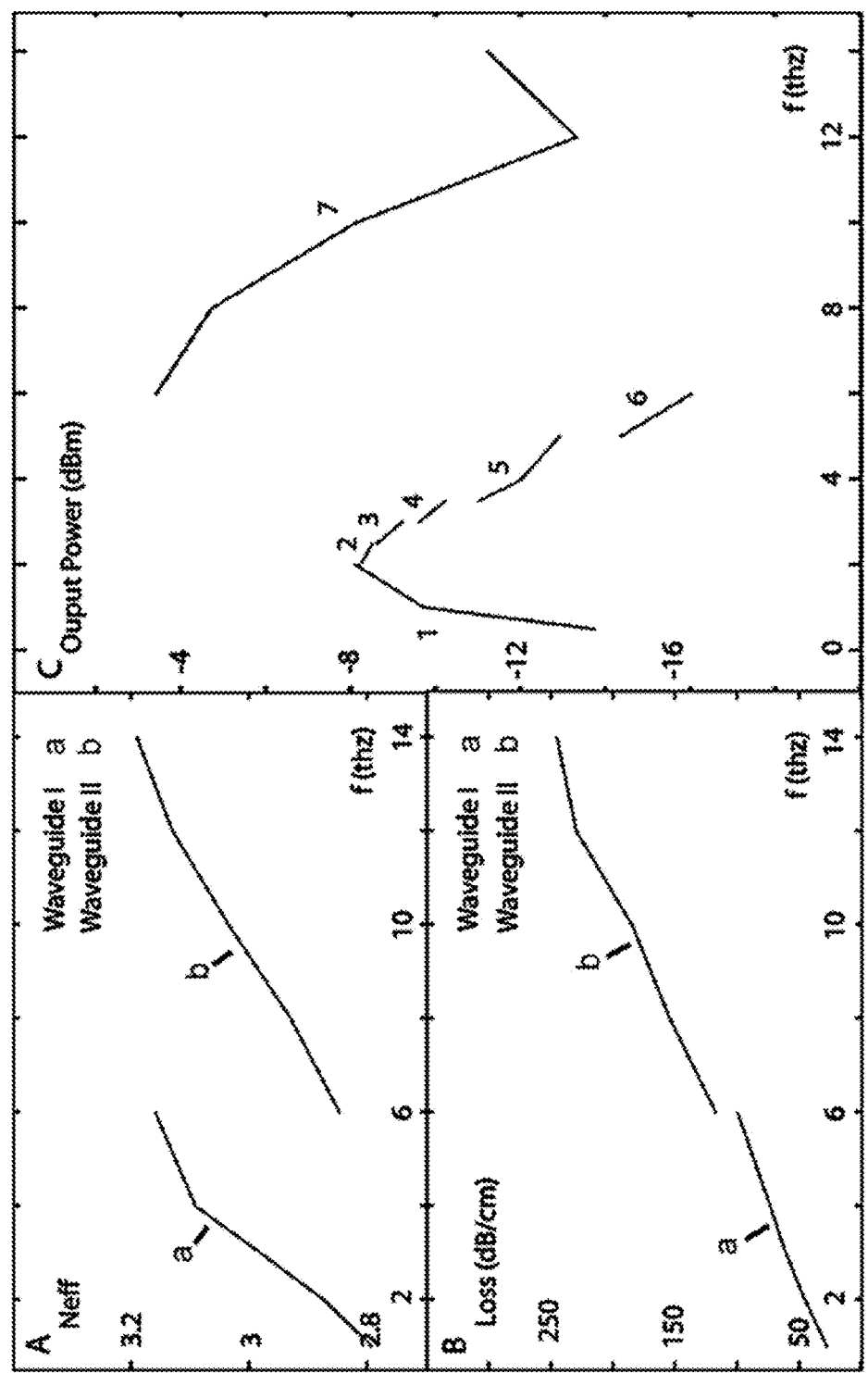
FIG. 22A, FIG. 22B and FIG. 22C are diagrams that illustrates characteristics of Terahertz waveguide modes, and output power, according to principles of the invention.

Once the effective indices for the modes are established, and the precise modal patterns known, it is possible to calculate the conversion efficiency via the relations presented in the theoretical discussion given above. Table 4 and FIG. 22 provide a summary of the CW output powers achievable as a function of wavelength. It is possible to change the waveguide width lithographically, suggesting that these devices may well serve in an array to maximize the frequency coverage on a particular chip. Output power in the high micro-Watt level is predicted across the entire frequency range from 0.5 THz up to 15 THz.

Table 4 provides a full list of the device design parameters for seven designs, along with the performance data expected for each. The two input lasers are assumed to be 500 mW in continuous-wave power. The $\chi^2$ value is taken to be 500 pm/V, or $2\times10^{-9}$ m/V. The optical waveguide loss is taken to be 6 dB/cm, which is a safe upper bound on expected losses. Note that the optical waveguide width corresponds to letter G in FIG. 1. The predicted output spectra generated by these devices are plotted in FIG. 22.

TABLE 4

Description of Terahertz waveguide parameters and device performances

| Device No. | Optical Waveguide Width (μm) | Device Length (mm) | Terahertz Waveguide Type | Output Frequency Range (thz) | Output Power Range (dBm) | Input Laser Range Needed (nm) |
|---|---|---|---|---|---|---|
| 1 | 0.375 | 5 | I | 0.5-2 | −13.7, −8.1 | 1480-1600 |
| 2 | 0.4 | 4 | I | 2-2.5 | −8.2, −8.5 | 1480-1600 |
| 3 | 0.425 | 3 | I | 2.5-3 | −8.6, −9.2 | 1480-1600 |
| 4 | 0.45 | 3 | I | 3-3.5 | −9.6, −10.2 | 1480-1600 |
| 5 | 0.5 | 3 | I | 3.5-5 | −11, −12.9 | 1480-1600 |
| 6 | 0.6 | 2.5 | I | 5-6 | −14.3, −16 | 1480-1600 |
| 7 | 0.4 | 2 | II | 6-14 | −3.4, −11.2 | 1300-1600 |

Operation as a Terahertz Detector

An important characteristic of these devices is that the generated Terahertz beam can be interchanged with one of the optical beams. As a result, if two optical beams at 0.5 Watts each generate a 1 THz output of 0.5 mW, then an optical beam at 0.5 watts and a Terahertz beam at 0.5 mW will be expected to generate an optical beam of 18 mW in the exact same device. That is, an STG can be used to shift a Terahertz signal into the optical regime, and also add about 15 dB of power. The output beam will be located at the pump optical frequency plus the Terahertz frequency, allowing for Terahertz detection schemes that will use conventional diode- or PMT-based optical detectors, which are extremely sensitive. By examining the output frequency with inexpensive and extremely sensitive optical spectrometers or monochromators in the near infrared, it will be possible to use such devices as a compact, high-sensitivity terahertz spectrometer.

Heating and Free Carrier Limitations on Performance

A typical problem with integrated optical continuous wave devices is the dissipation of waste heat. It is expected that any form of loss that does not result in scattered radiation will eventually convert the optical input energy to heat. Under continuous operation, this heat source will raise the temperature of the waveguide and polymer until it is balanced by heat dissipation mechanisms. If the steady state temperature exceeds a damage threshold, the device will fail prematurely.

Even though radiation at a 1300 nm wavelength and longer is beyond the silicon band edge, various mechanisms can produce free carriers, especially at high power. One such mechanism is two-photon absorption (TPA). In very small silicon ridge waveguides such as the ones we propose to use, surface state absorption can also create free carriers. This creates nonlinear loss on the optical signal, which can lead to rapid signal attenuation. To determine whether this would be a limitation, nonlinear loss measurements were performed on SOI waveguides with the 0.5×0.1 um dimension given above. It was found that the loss within a waveguide was well modeled by $$\frac{dI}{dz} = -\alpha_1 I - \alpha_2 I^2 \qquad \text{Eq. (1)}$$

where I is the propagating CW intensity of a beam, and where $\alpha_1$ is 0.00014 $\mu m^{-1}$, while $\alpha_2$ was $1.8\times10^{-6}$ $\mu m^{-1} mw^{-1}$. This corresponds to about 12 dB/cm of additional loss at a CW power of 150 mW. While this is certainly problematic, it should be remembered that the terahertz waveguide losses are far higher, and so the interaction length in which a terahertz beam can be generated is fairly short. Therefore, the optical losses are not important in most cases until they cause significant attenuation in only a few millimeters. All-optical pump-probe measurements were also performed in order to determine minority carrier lifetimes. The minority carrier lifetime was found to be around 1 ns.

The nonlinear loss can be reduced by removing the free carriers. Several methods have been demonstrated for electrically sweeping excess carriers from a silicon waveguide to reduce effective carrier lifetime. Additionally, it has been demonstrated that ion implantation of Ar+ ions can reduce the free carrier lifetime to 100 ps, which would amount to a decrease in the nonlinear loss our waveguides experience by a factor of 10. It is expected that this approach could also be integrated into our process, since it does not require any change in the waveguide geometry or electrical contact. Finally, it is possible to treat silicon waveguides such as these to reduce surface state absorption and waveguide loss. Lowering the waveguide loss would also help the raise the thermal damage threshold.

Absorption of the terahertz mode by free carrier accumulation is expected to be less important. This is due to the fact that although the absorption coefficient of terahertz radiation due to free carriers is approximately 10 times larger, the area of the silicon waveguide is much less than 10% of the area of the terahertz mode, suggesting that the terahertz mode will not experience larger losses than the optical mode due to a given free carrier concentration. It is believed that optically induced free carrier absorption does not pose a fundamental limitation to the proposed device.

Devices according to the foregoing design are expected to provide room temperature CW generation of Terahertz radiation. Other than the nonlinear polymer, our system comprises materials that are commonly used in semiconductor manufacturing processes. The STG described herein is expected to function at room temperature, and is expected to provide a level of output power that is far larger than what comparable processes can currently demonstrate.

Advantages and Disadvantages of Waveguide Approach

The conventional waveguide approach to nonlinear optical processes can be described in general terms as follows. A waveguide for each type of radiation is constructed in the same location, with the nonlinear material overlapping all waveguide modes. As all modes flow down the waveguide, the amplitude of the frequency or frequencies to be generated is gradually increased in a linear fashion from the nonlinear process. If the relevant phase matching conditions are met and there is not a significant amount of waveguide loss, the amplitude will build up in a linear fashion as light progresses down the waveguide. In the ideal, lossless and perfectly phase matched case, the optical power at the generated frequency increases as:

$$P \propto L \qquad (2)$$

The quadratic dependence of power on length suggests that extremely high conversion efficiencies can eventually be obtained, provided the waveguide loss and phase mismatch conditions do not become limitations.

In typical realizable systems, however, the exceptional performance suggested by (2) can never be approached. First, it can be difficult to fabricated waveguides with overlapping modes for vastly different frequencies. In FIG. 19, for instance, two metal plates need to be placed around a silicon ridge waveguide to guide the terahertz radiation, which is clearly a potentially challenging fabrication task. Second, the phase matching constraints may be very difficult to attain. In the case of the design presented above, for instance, the distinctly different effective indices of the radiation in the near infrared and the terahertz radiation suggest that it may prove exceptionally difficult to obtain coherent power conversion beyond a length of a few millimeters.

Having described a design for a method to generate terahertz radiation from difference frequency generation in a nonlinear polymer—metal waveguide hybrid system, we now turn to some alternative designs.

Vertical Coupling Approach

Figure 23:
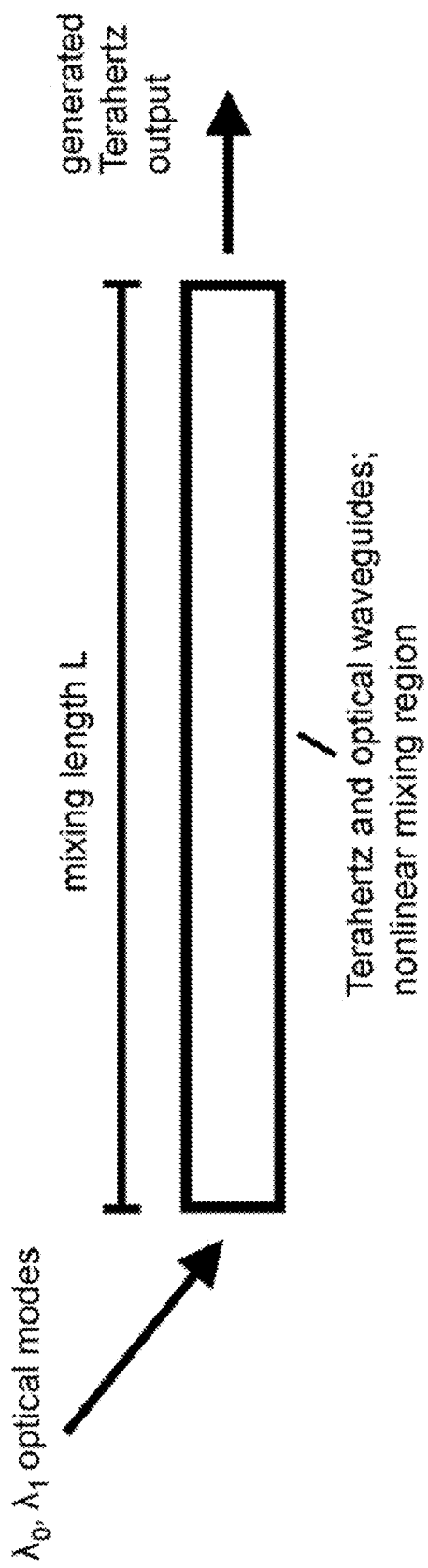
FIG. 23 is a drawing illustrating the operation and logic of an illustrative waveguide based difference frequency generation device.

FIG. 23 is a drawing describing schematically the operation and logic of an illustrative waveguide based difference frequency generation device. As illustrated in FIG. 23, two beams of optical radiation having wavelengths $\lambda_0$ and $\lambda_1$ and frequencies $w_0$ and $w_1$, respectively, are introduced into a high index contrast waveguide that is adjacent a material that exhibits a nonlinear optical coefficient. The interaction of the two beams generates a signal at a terahertz frequency corresponding to a difference between the first frequency of the first input light beam and the second frequency of the second input light beam.

In this alternative approach for nonlinear processes such as difference frequency generation, one arranges a situation in which the modal pattern of the generated frequency is vertically coupled. The power generated can be made sizable by keeping the length L of any individual waveguide segment as shown in FIG. 23 short enough that the phase matching conditions described above are not violated, but increasing the total length by having a plurality of parallel segments, each of a short enough length that the phase matching conditions do not break down.

Figure 24A:
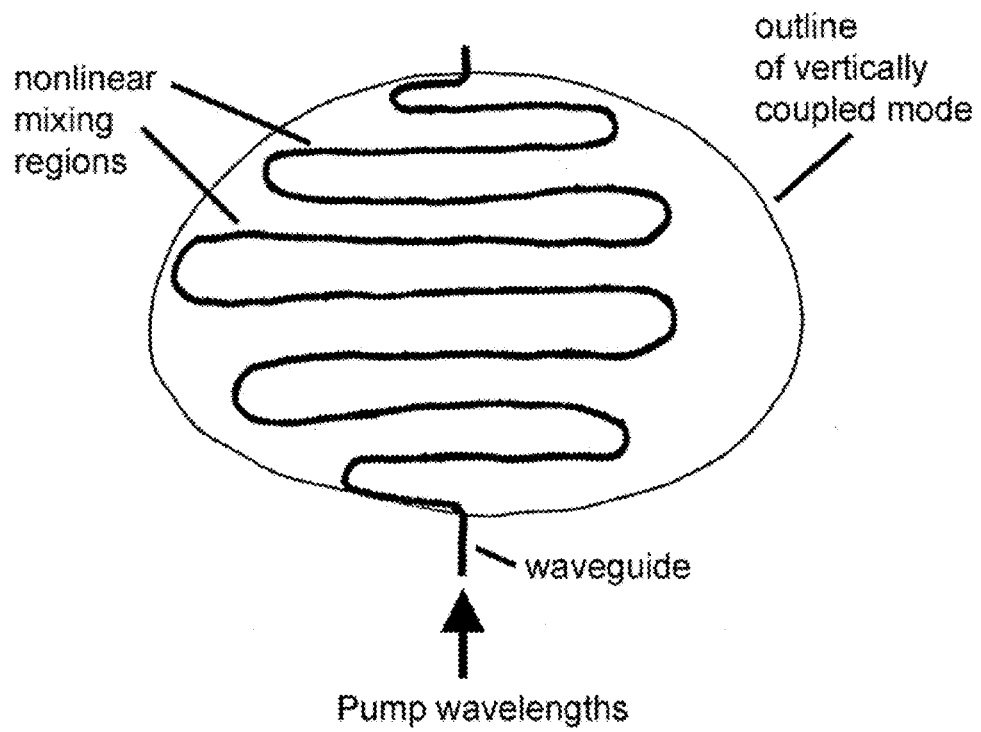
FIG. 24A is a diagram in plan view that illustrates One approach to nonlinear generation with vertical coupling.

This can be achieved by a number of approaches. In one approach, a single waveguide illuminated with the two pump frequencies zig zags back and forth, as shown in FIG. 24A. The nonlinear material can also be periodically poled in order to achieve a phase matching condition. Another way phase matching could be obtained is by having the waveguide loops that fall outside the generated modal region vary in length.

Figure 24B:
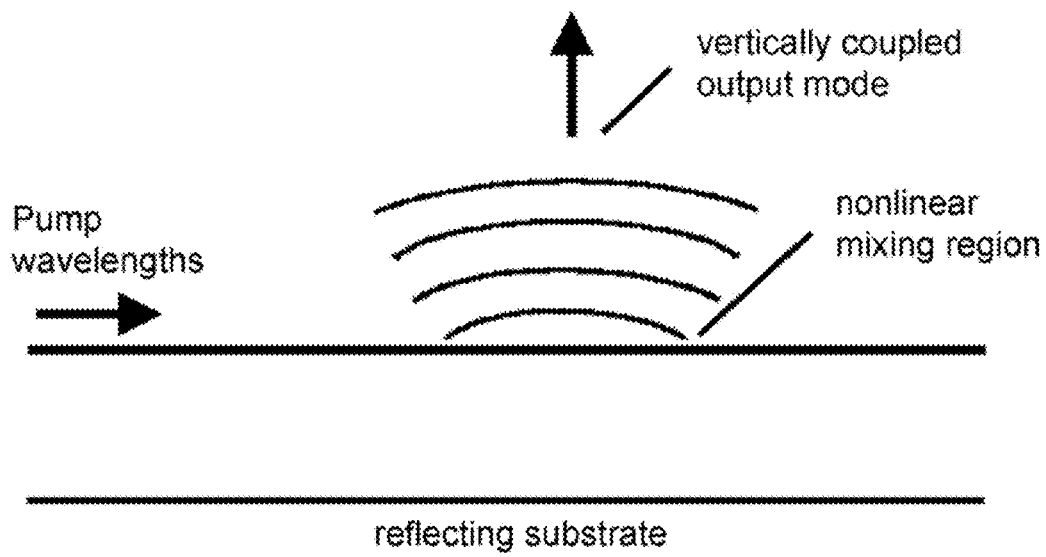
FIG. 24B is a diagram in elevation that illustrates One approach to nonlinear generation with vertical coupling.

The generated frequencies can be selected to have a Gaussian beam mode, allowing for coupling out of plane at normal incidence. Coupling at other angles would also be possible. FIG. 24A is a diagram in plan view and FIG. 24B is a diagram in elevation that illustrate the first approach to nonlinear generation with vertical coupling. In FIG. 24, the waveguide zig-zags back and forth, following roughly the outline of a beam for the generated mode. The generated frequencies emerge vertically. A properly placed reflecting substrate can also help ensure that power is guided in one direction.

Assuming that the area of the coupled mode overlaps the zig-zagging waveguide at all points, the coupling efficiency will be approximately:

$$P \propto L \quad (3)$$

The asymptotic behavior of the conversion mechanism is clearly not as good as the square law behavior. However, the serious limitation of requiring a waveguide for distinctly different frequencies has now been removed. The effective interaction length that can be achieved possibly is far larger. The added length can more than compensated for the lack of quadratic scaling.

A common limitation in nonlinear generation schemes is the limitation on length dictated by waveguide loss. One way to compensate for this is to use higher power pump lasers, but there is a limitation on this on the basis of the damage threshold of the waveguides. When coupling into a vertically coupled mode, a possible solution to this is to divide the intensity from a more powerful source into several coherent modes, each passing through a separate waveguide and interacting with different regions of the material that exhibits a nonlinear optical coefficient. Each such parallel segment can then form part of the vertical coupling region. This intensity division and parallel application of the pump beam can provide longer effective lengths. Each parallel segment can then each couple into part of the vertically coupled mode.

Figure 25A:
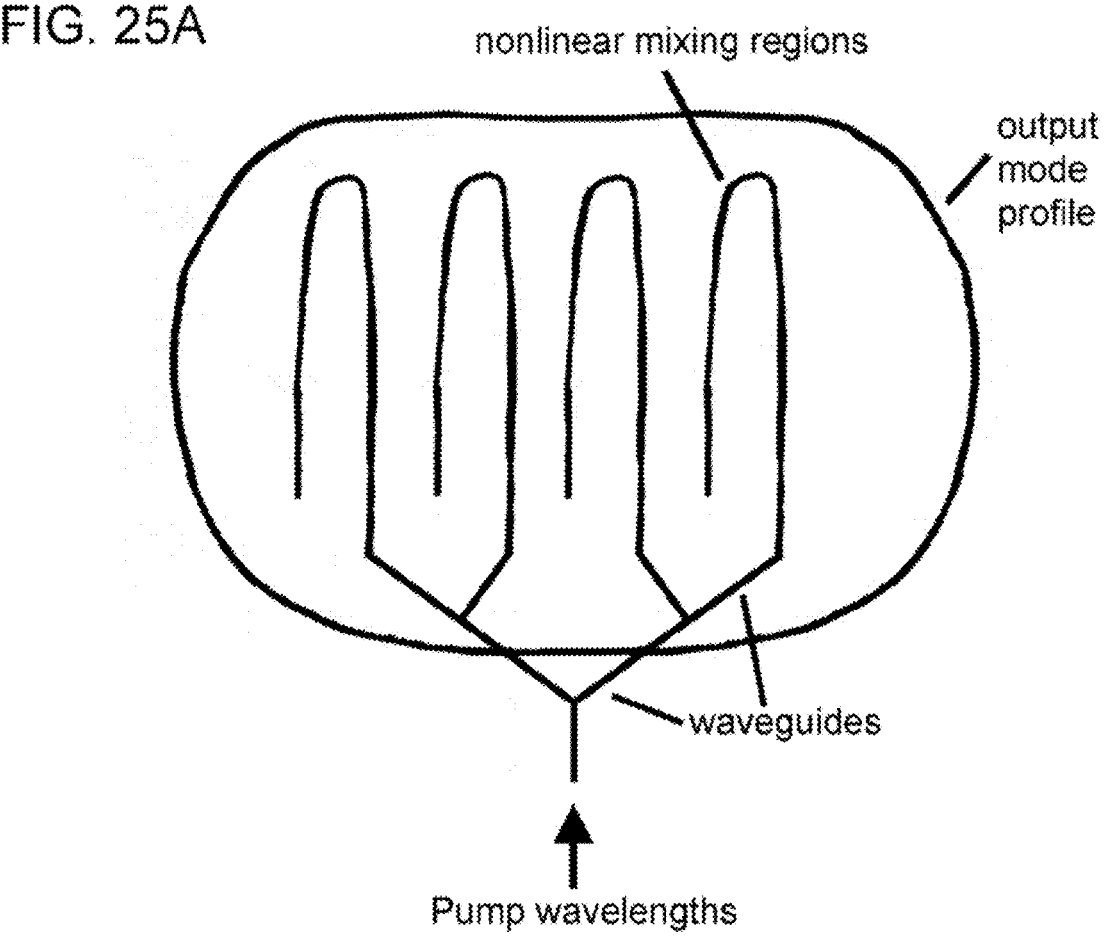
FIG. 25A is a diagram in plan view that illustrates how longer effective lengths can be obtained by dividing a powerful optical mode into several less powerful modes, which can then each couple into part of the vertically coupled mode.
Figure 25B:
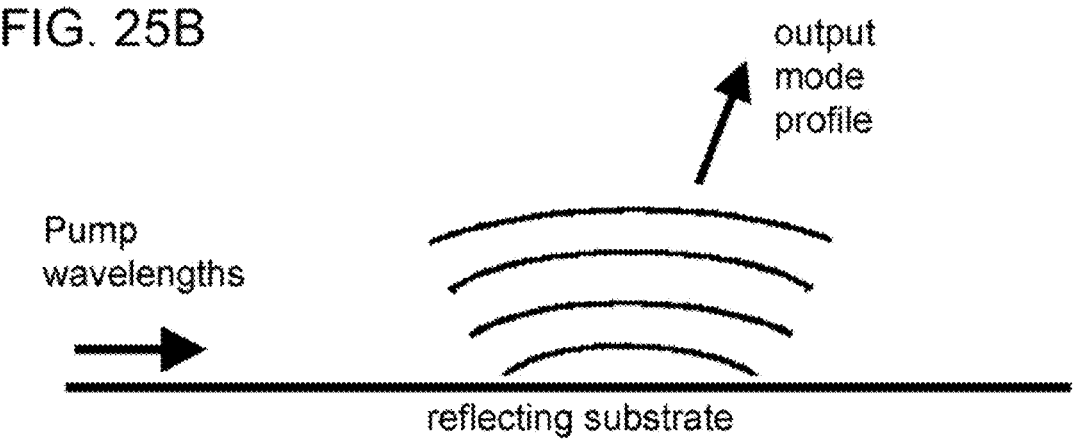
FIG. 25B is a diagram in elevation that illustrates how longer effective lengths can be obtained by dividing a powerful optical mode into several less powerful modes, which can then each couple into part of the vertically coupled mode.

FIG. 25A is a diagram in plan view and FIG. 25B is a diagram in elevation that illustrates how longer effective lengths can be obtained by dividing a powerful optical mode into several less powerful modes, which can then each couple into part of the vertically coupled mode.

In addition, the waveguides approaching the nonlinear region can be built with larger mode volumes to be less susceptible to damage from the beams passing through them. In some embodiments, the material that exhibits a nonlinear coefficient is prevented from touching these waveguides. Using this approach, the power generated at any given frequency is only limited by the largest power available from a coherent source, because the waveguide loss can be minimized by controlling the length and the power can be maintained below the damage threshold of the waveguides by using a waveguide geometry in which the power is held below a damage limit by dividing the power among a plurality of parallel waveguides.

In addition, by having a plurality of similar (or identical) waveguides in a defined array, for example as shown in FIG. 25A and FIG. 25B, one can steer an output beam by applying phased array methods and principles. Such methods can include: controlling the relative phases of illumination passing through different parallel waveguides, including applying phase shifts to one or more beams of generated illumination in different ones of the plurality of parallel waveguides, thereby controlling the direction of beam propagation and the beam intensity; controlling which of different ones of the plurality of parallel waveguides carry generated beams at any particular time, so as to define a plurality of active ones of the plurality of parallel waveguides, thereby controlling the direction of beam propagation and the beam intensity; and defining the geometrical relationships between and among different ones of the plurality of parallel waveguides.

We have described several embodiments of devices, and several methods of operation of devices, that are expected to provide generated beams of illumination at frequencies resulting from sums and/or differences of at least two input frequencies of applied illumination. These devices are expected to generate illumination that can be steered using principles relating to the interaction of sources of illumination that are configured to provide phase relationships between and among the different ones of the plurality of generated beams that define a direction of propagation and an intensity of the generated illumination. The generated beam or beams of illumination can be used for many different purposes, including, but not limited to, data, voice and image transmission, data processing, and signaling.

Theoretical Description

A theoretical description relating to generation of terahertz radiation has been presented in U.S. Pat. No. 7,480,434, which is incorporated herein by reference in its entirety.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. An apparatus for generating and steering electromagnetic radiation, comprising:
    a substrate having a surface; and
    a waveguide adjacent said surface of said substrate, said waveguide having at least one input port for receiving a first input light beam having a first frequency and a second input light beam having a second frequency different from said first frequency, and configured to have a plurality of adjacent waveguide segments, said plurality of adjacent waveguide segments of said waveguide configured as a phased array;
    said waveguide is configured so that, in response to a first input light beam provided as a first laser beam having a first frequency, and a second input light beam provided as a second laser beam having a second frequency, an output electromagnetic radiation beam is generated that includes a signal at a frequency corresponding to a difference between said first frequency of said first input light beam and said second frequency of said second input light beam, said output electromagnetic radiation beam configured to be steered by said phased array.

2. The apparatus for generating and steering electromagnetic radiation of claim 1, wherein said substrate comprises silicon.

3. The apparatus for generating and steering electromagnetic radiation of claim 1, wherein said electromagnetic radiation is terahertz electromagnetic radiation.

4. The apparatus for generating and steering electromagnetic radiation of claim 3, wherein said waveguide has a width dimension in the range of 0.4 µm to 0.6 µm.

5. The apparatus for generating and steering electromagnetic radiation of claim 3, wherein said waveguide has a thickness dimension of approximately 0.1 µm.

6. The apparatus for generating and steering electromagnetic radiation of claim 1, wherein said waveguide is a high index contrast waveguide.

7. The apparatus for generating and steering electromagnetic radiation of claim 1, further comprising a cladding adjacent said waveguide, said cladding comprising a material that exhibits a nonlinear optical coefficient.

8. The apparatus for generating and steering electromagnetic radiation of claim 7, wherein said cladding comprising a material that exhibits a nonlinear optical coefficient is a material exhibiting a $\chi^2$ coefficient.

9. The apparatus for generating and steering electromagnetic radiation of claim 8, further comprising electrodes for poling said material exhibiting a $\chi^2$ coefficient.

10. The apparatus for generating and steering electromagnetic radiation of claim 7, wherein said cladding comprising a material that exhibits a nonlinear optical coefficient is a material exhibiting a $\chi^3$ coefficient.

11. The apparatus for generating and steering electromagnetic radiation of claim 7, wherein said cladding adjacent said waveguide is an optical polymer.

12. The apparatus for generating and steering electromagnetic radiation of claim 7, wherein said cladding comprising a material that exhibits an enhanced nonlinear optical coefficient is an electro-optic polymer material.

13. The apparatus for generating and steering electromagnetic radiation of claim 1, wherein said plurality of adjacent waveguide segments of said waveguide configured as a phased array are configured in a serpentine configuration.

14. The apparatus for generating and steering electromagnetic radiation of claim 1, wherein said plurality of adjacent waveguide segments of said waveguide configured as a phased array are configured as segments that branch from a common input.

15. The apparatus for generating and steering electromagnetic radiation of claim 1, wherein said plurality of adjacent waveguide segments of said waveguide configured as a phased array are configured to control a relative phase of illumination passing through different ones of said plurality of adjacent waveguides.

16. The apparatus for generating and steering electromagnetic radiation of claim 15, wherein said plurality of adjacent waveguide segments of said waveguide configured as a phased array are configured to apply a phase shift to one or more beams of generated illumination in different ones of said plurality of adjacent waveguides.

17. The apparatus for generating and steering electromagnetic radiation of claim 1, wherein said plurality of adjacent waveguide segments of said waveguide configured as a phased array are configured to control which of different ones of the plurality of parallel waveguides carry generated beams at any particular time.

18. The apparatus for generating and steering electromagnetic radiation of claim 1, wherein at least one of said first input light beam and said second input light beam is a continuous-wave laser beam.

19. A method of generating and steering electromagnetic radiation, comprising the steps of:
    providing a structure comprising:
        a substrate having a surface; and
        a waveguide adjacent said surface of said substrate, said waveguide having at least one input port for receiving a first input light beam having a first frequency and a second input light beam having a second frequency different from said first frequency, and configured to have a plurality of adjacent waveguide segments, said plurality of adjacent waveguide segments of said waveguide configured as a phased array;
    said waveguide is configured so that, in response to a first input light beam provided as a first laser beam having a first frequency, and a second input light beam provided as a second laser beam having a second frequency, an output electromagnetic radiation beam is generated that includes a signal at a frequency corresponding to a difference between said first frequency of said first input light beam and said second frequency of said second input light beam, said output electromagnetic radiation beam configured to be steered by said phased array;

providing a first continuous-wave laser beam having a first frequency as input at said at least one input port;

providing a second continuous-wave laser beam having a second frequency different from said first frequency as input at said at least one input port, and observing electromagnetic radiation at a difference frequency between said first frequency of said first input laser beam and said second frequency of said second input laser beam.

20. The method of generating and steering electromagnetic radiation of claim 19, further comprising the step of controlling a relative phase of illumination passing through different ones of said plurality of adjacent waveguides.

21. The method of generating and steering electromagnetic radiation of claim 19, further comprising the step of applying a phase shift to one or more beams of generated illumination in different ones of said plurality of adjacent waveguides.

22. The method of generating and steering electromagnetic radiation of claim 19, further comprising the step of controlling which of different ones of the plurality of parallel waveguides carry generated beams at any particular time.

23. The method of generating and steering electromagnetic radiation of claim 19, further comprising the step of controlling an intensity of said generated electromagnetic radiation.

* * * * *